US012318958B2

(12) United States Patent
Lindee et al.

(10) Patent No.: US 12,318,958 B2
(45) **Date of Patent: *Jun. 3, 2025**

(54) HIGH SPEED SLICING MACHINE

(75) Inventors: Scott A. Lindee, Mokena, IL (US); James E. Pasek, Tinley Park, IL (US); David Hancock, Morris, IL (US); Thomas C. Wolcott, LaGrange, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 739 days.

This patent is subject to a terminal disclaimer.

(21) Appl. No.: 13/099,325

(22) Filed: May 2, 2011

(65) Prior Publication Data

US 2011/0265624 A1 Nov. 3, 2011

Related U.S. Application Data

(60) Provisional application No. 61/343,551, filed on May 1, 2010.

(51) Int. Cl.
*B26D 7/32* (2006.01)
*B26D 7/22* (2006.01)
(Continued)

(52) U.S. Cl.
CPC ............... *B26D 7/32* (2013.01); *B26D 7/225* (2013.01); *B26D 5/00* (2013.01);
(Continued)

(58) Field of Classification Search
CPC ........ B26D 7/06; B26D 7/0625; B26D 7/225; B26D 7/0683; B26D 7/30; B26D 7/32;
(Continued)

(56) References Cited

U.S. PATENT DOCUMENTS 2,047,400 A * 7/1936 Walter ................. B26D 7/0608 83/273
4,226,176 A 10/1980 Macchi
(Continued)

FOREIGN PATENT DOCUMENTS

DE 2912446 10/1980
DE 39 12 446 A1 10/1990
(Continued)

OTHER PUBLICATIONS

European Search Report for European Patent Application No. EP 11 77 8126 dated Jan. 26, 2015, 3 pages.
(Continued)

*Primary Examiner* — Phong H Nguyen
(74) *Attorney, Agent, or Firm* — Klintworth & Rozenblat IP LLP

(57) ABSTRACT

A high speed food article slicing machine with a slicing station, a moveable frame supporting a food article feed mechanism frame, a food article gate, and a safety guard system for detecting an intrusion into the machine. Food articles are loaded onto a lift tray and raised to a staging position where food articles are in contact with a food article gate. The lift tray is located inline with the food article feed paths such that lateral shifting of food articles into the feed paths is not needed. Food article grippers, individually driven along feed paths by an overhead conveyor, move food articles over the food article gate towards the slicing station. The food article gate functions to assist in removal of food article end portions. The slicing machines utilizes a horizontally radiating laser intrusion detector to shut down systems when an unwanted intrusion is sensed.

10 Claims, 21 Drawing Sheets

(51) Int. Cl.
*B26D 5/00* (2006.01)
*B26D 7/01* (2006.01)
*B26D 7/06* (2006.01)
*B26D 7/30* (2006.01)

(52) U.S. Cl.
CPC ...... *B26D 2007/011* (2013.01); *B26D 7/0683* (2013.01); *B26D 7/30* (2013.01); *B26D 2210/02* (2013.01); *Y10T 83/2074* (2015.04); *Y10T 83/654* (2015.04)

(58) Field of Classification Search
CPC ........... B26D 2210/00; B26D 2210/02; B65G 15/00; B65G 15/10; B65G 15/12; B65G 15/14; B65G 15/16; B65G 15/30; B65G 15/50; Y10S 83/932; Y10T 83/6668; Y10T 83/202; Y10T 83/2192; Y10T 83/2194; Y10T 83/4531; Y10T 83/463; Y10T 83/647; Y10T 83/6502; Y10T 83/6504; Y10T 83/6505; Y10T 83/6537; Y10T 83/6945; Y10T 83/885; Y10T 83/9377; Y10T 83/9379; Y10T 83/9403
USPC ........ 83/734, 932, 78, 155, 155.1, 237, 276, 83/401, 709–711, 731, 761, 633, 665, 83/666, 676; 198/415, 623, 817
See application file for complete search history.

(56) References Cited

U.S. PATENT DOCUMENTS

| | | | | |
|---|---|---|---|---|
| 4,583,435 | A | 4/1986 | Fessler | |
| 4,934,232 | A * | 6/1990 | Weber | B26D 1/15 83/355 |
| 5,191,820 | A | 3/1993 | Hartmann | |
| 5,628,237 | A | 5/1997 | Lindee et al. | |
| 5,974,925 | A | 11/1999 | Lindee et al. | |
| 6,415,698 | B1 | 7/2002 | Haas et al. | |
| 8,978,529 | B2 * | 3/2015 | Pasek | B26D 7/06 83/761 |
| 2004/0016331 | A1 | 1/2004 | Wolcott et al. | |
| 2004/0031363 | A1 * | 2/2004 | Lindee | B26D 7/0683 83/73 |
| 2004/0055439 | A1 | 3/2004 | Lindee et al. | |
| 2004/0139706 | A1 * | 7/2004 | Drebing et al. | 53/540 |
| 2005/0082147 | A1 * | 4/2005 | Mol | 198/834 |
| 2005/0132855 | A1 * | 6/2005 | Weber | 83/155 |
| 2005/0132864 | A1 * | 6/2005 | Biggs | A22C 17/0033 83/788 |
| 2005/0199111 | A1 | 9/2005 | Sandberg et al. | |
| 2006/0289281 | A1 | 12/2006 | Sandberg | |
| 2007/0214969 | A1 | 9/2007 | Mueller et al. | |
| 2008/0016999 | A1 | 1/2008 | Mathues et al. | |
| 2008/0185095 | A1 * | 8/2008 | Gutknecht | 156/304.1 |
| 2008/0250944 | A1 * | 10/2008 | Pryor | B26D 7/27 99/537 |
| 2009/0120256 | A1 | 5/2009 | Pasek | |
| 2009/0145272 | A1 | 6/2009 | Sandberg et al. | |
| 2010/0307304 | A1 | 12/2010 | Weber | |

FOREIGN PATENT DOCUMENTS

| | | | |
|---|---|---|---|
| DE | 4235985 | | 4/1994 |
| DE | 3912446 | C2 | 8/1996 |
| DE | 195 18 583 | A1 | 11/1996 |
| DE | 195 18 595 | A1 | 11/1996 |
| DE | 19525742 | * | 1/1997 |
| DE | 10135846 | A1 | 2/2003 |
| DE | 10353114 | | 5/2005 |
| DE | 102008020248 | | 11/2009 |
| DE | 20201111171 | U1 | 4/2019 |
| EP | 0398602 | | 11/1990 |
| EP | 0 547 389 | A1 | 6/1993 |
| EP | 0713753 | A2 | 5/1996 |
| EP | 2566670 | | 7/2016 |
| FR | 2677573 | A1 | 12/1992 |
| JP | 2000-288983 | * | 10/2000 |
| WO | 89/06588 | | 7/1989 |
| WO | 0230635 | A1 | 4/2002 |
| WO | 2005/037501 | | 4/2005 |
| WO | 2010011237 | A1 | 1/2010 |
| WO | 2011/139996 | | 11/2011 |

OTHER PUBLICATIONS

International Search Report dated Jan. 27, 2012.
Machine translation of DE2912446.
Machine translation of DE4235985.
Machine translation of DE10353114.
Machine translation of DE102008020248.
Machine translation of WO2005037501.
U.S. Appl. No. 61/343,551, entitled "High Speed Slicing Machine," filed May 1, 2010, 39 pages.
Machine translation of FR2677573.
Declaration (Redacted) of Carlsten Reisz, Weber EX1011 (8 Parts), IPR2020-01556, Sep. 11, 2020.
Declaration of David Frett, Weber EX1017 (7 Parts), IPR2020-01556, Aug. 21, 2020.
Petitioner Weber, Inc.'s Power of Attorney, Weber EX1020, IPR2020-01557, Sep. 15, 2020, 2 pages.
Petition for inter partes review of U.S. Pat. No. 10,639,812, Weber EX1021, IPR2020-01557, Sep. 16, 2020, 98 pages.
Petitioner Weber, Inc.'s motion under 37 C.F.R. §§ 42.14, 42.54, and 42.55 to seal exhibits EX1010, EX1011, and EX1016 and enter protective order, IPR2020-01557, Sep. 16, 2020, 59 pages.
Declaration (Redacted) of Jorn Schreiber, Weber EX1010 (8 Parts), IPR2020-01556, Sep. 14, 2020.
Petition for inter partes review of U.S. Pat. No. 10,625,436, Weber EX1020, IPR2020-01556, Sep. 16, 2020, 94 pages.
Petitioner Weber, Inc.'s motion under 37 C.F.R. §§ 42.14, 42.54, and 42.55 to seal exhibits EX1010, EX1011, and EX1016 and enter protective order, IPR2020-01556, Sep. 16, 2020, 59 pages.
Petitioner Weber, Inc.'s Power of Attorney, Weber EX1022, IPR2020-01556, Sep. 15, 2020, 2 pages.
Declaration (Redacted) of Carlsten Reisz, Weber EX1011 (8 Parts), IPR2020-01557, Sep. 11, 2020.
Bryan Salvage, "Just The Right Slice", Meat&Poultry, p. 78-83, Aug. 2008, Weber EX1018 IPR2020-01556, 5 pages.
Machine translation of DE 20201111171.
Machine translation of DE 10135846.
Declaration of Richard Hooper, Ph.D., P.E. in Support of Petition for Inter Partes Review of U.S. Pat. No. 10,625,436, Weber EX1003, IPR2020-01556, Sep. 15, 2020, 182 pages.
Declaration (Redacted) of Frank Rypel, Weber EX1016 (10 Parts), IPR2020-01556, Aug. 25, 2020.
Declaration (Redacted) of Frank Rypel, Weber EX1016 (10 Parts), IPR2020-01557, Aug. 25, 2020.
Patent Owner's (Provisur Technologies, Inc.) Mandatory Notice 37 C.F.R. § 42.8(b), Case IPR2020-01557, Dec. 11, 2020, 5 Pages.
Patent Owner's (Provisur Technologies, Inc.) Power of Attorney, Case IPR2020-01557, Dec. 11, 2020, 3 Pages.
Patent Owner's (Provisur Technologies, Inc.) Redacted Preliminary Response to Petition for Inter Partes Review of U.S. Pat. No. 10,639,812 B2, Case IPR2020-01557, Dec. 29, 2020, 44 Pages.
General Sales and Delivery Terms and Conditions of The Weber Group, Exhibit 2001, Case IPR2020-01557, Dec. 28, 2020, 9 Pages.
Notice of Filing Date Accorded to Petition and Time for Filing Patent Owner Preliminary Response, Case IPR2020-01557, Sep. 29, 2020, 5 Pages.
Patent Owner's (Provisur Technologies, Inc.) Mandatory Notice 37 C.F.R. § 42.8(b), Case IPR2020-01556, Dec. 11, 2020, 5 Pages.
Patent Owner's (Provisur Technologies, Inc.) Power of Attorney, Case IPR2020-01556, Dec. 11, 2020, 3 Pages.
Patent Owner's (Provisur Technologies, Inc.) Redacted Preliminary Response to Petition for Inter Partes Review of U.S. Pat. No. 10,625,436 B2, Case IPR2020-01556, Dec. 29, 2020, 45 Pages.

(56) References Cited

OTHER PUBLICATIONS

General Sales and Delivery Terms and Conditions of The Weber Group, Exhibit 2001, Case IPR2020-01556, Dec. 28, 2020, 9 Pages.
Notice of Filing Date Accorded to Petition and Time for Filing Patent Owner Preliminary Response, Case IPR2020-01556, Sep. 29, 2020, 5 Pages.
Curriculum Vitae of Richard Hooper, Weber EX 1004, IPR2020-01556, Jan. 1, 2019, 6 pages.
Declaration of David Frett, Weber EX1017 (7 Parts), IPR2020-01557, Aug. 21, 2020.
Declaration (Redacted) of Jorn Schreiber, Weber EX1010 (8 Parts), IPR2020-01557, Sep. 14, 2020.
Operating Manual of Slicer CCS-904_06_2006-07-01_GB / T-07_2005-11-10, Weber EX1005, IPR2020-01556, 330 pages.
Operating Manual of Slicer CCS-904-02 (for product lengths to 1200mm/1600mm)(Part 1 & 2), Weber EX1009, IPR2020-01556, Jan. 25, 2010, 194 pages.
Betriebsanleitung SlicerCCS 904, CCS-904_06_2006-07-01_DE / T-07_2005-11-10, Weber EX1015, IPR2020-01556, 288 pages.
Weber Internet Archive, https://web.archive.org/web/20051108022254/http:/www.weberslicer.com:80/, Weber EX1019, IPR2020-01556, Sep. 10, 2020, 1 page.
DE '071 Weber's submission dated May 5, 2020, 30 pages.
Weber's Submission dated Dec. 6, 2019, 5 pages.
English language machine translation of Weber's Submission dated Dec. 6, 2019, 5 pages.
Communication regarding DE 20 2011 111 071.4, dated Jul. 17, 2019, 2 pages.
Cancellation Request regarding DE 20 2011 111 071, dated Jul. 9, 2019, 18 pages.
Feature analysis regarding DE 20 2011 111 071, dated Jul. 9, 2019, 2 pages.
D23 AGB Weber, Allgemeine Verkaufs- und Lieferbedingungen der Weber-Gruppe, Jan. 2008, 2 pages.
D20 Decision of German District Court Munich 7 O 155340-19, Jun. 19, 2020, 18 pages.
D21 Interocutory Decision of EPO for Application No. 11 778 126.0, dated Dec. 20, 2018, 15 pages.
D22 Decision of German Federal Supreme Court Konditionierverfahren, Apr. 21, 2020, 29 pages.
19508LO Submission as filed, No. 20 2011 111 071.4, dated Feb. 6, 2020, 30 pages.
DE 20 2011 111 071 Communication of GPTO dated Jun. 18, 2020, 1 page.
English translation of Weber's submission dated Feb. 10, 2021 relating to DE 20 2011 111071 U1, 14 pages.
Weber's submission dated Feb. 10, 2021 relating to DE 20 2011 111071 U1 with enclosures, 240 pages.
Weber's submission dated Jun. 21, 2021 relating to DE 20 2011 111071 U1, 84 pages.
English machine translation of Weber's submission dated Jun. 21, 2021 relating to DE '071, 1 page.
Opponent Response dated Jun. 5, 2024, submitted in Opposition to European Patent No. 2 566 670.

* cited by examiner

HIGH SPEED SLICING MACHINE

This application claims the benefit of U.S. Provisional Application No. 61/343,551, filed May 1, 2010.

BACKGROUND OF THE INVENTION

Many different kinds of food articles or food products, such as food slabs, food bellies, or food loaves are produced in a wide variety of shapes and sizes. There are meat loaves made from various meats, including ham, pork, beef, lamb, turkey, and fish. The meat in the food loaf may be in large pieces or may be thoroughly comminuted. These meat loaves come in different shapes (round, square, rectangular, oval, etc.) and in different lengths up to six feet (183 cm) or even longer. The cross-sectional sizes of the loaves are quite different; the maximum transverse dimension may be as small as 1.5 inches (4 cm) or as large as ten inches (25.4 cm). Loaves of cheese or other foods come in the same great ranges as to composition, shape, length, and transverse size.

Typically the food loaves are sliced, the slices are grouped in accordance with a particular weight requirement, and the groups of slices are packaged and sold at retail. The number of slices in a group may vary, depending on the size and consistency of the food article and the desire of the producer, the wholesaler, or the retailer. For some products, neatly aligned stacked slice groups are preferred. For others, the slices are shingled or folded so that a purchaser can see a part of every slice through a transparent package.

Food articles can be sliced on high speed slicing machines such as disclosed in Published Patent Document WO 2010/011237 A1 or U.S. Pat. Nos. 5,628,237 or 5,974,925; or as commercially available as the Power Max 4000™ and FX180® slicers available from Formax, Inc. of Mokena, Illinois, USA.

The FX180® machine can be configured as an automatically loaded, continuous feed machine, or an automatically loaded, back-clamp or gripper type machine.

For an automatically loaded, continuous feed machine, side-by-side upper and lower conveyor pairs drive food articles into the cutting plane. A gate is located in front of the conveyors. The initial food articles are loaded with leading ends abutting the gate. The gate is lowered and the food articles proceed into the conveyors. When the initial food articles are sliced to the extent that the trailing ends of the food articles clear the gate, the gate is raised and new food articles are loaded in the feed paths, held back by the gate. Shortly thereafter the gate is lowered and new food articles slide down to where lead ends of the new food articles abut trailing ends of the initial food articles being sliced. The new food articles are driven into the cutting plane trailing the initial food articles. Food articles are sequentially and continuously loaded in this manner, lead end-to-trailing end, in abutting contact with the preceding food articles.

U.S. Pat. No. 5,628,237 and European patent EP 0 713 753 describe a back-clamp or gripper type slicing machine. According to this type of slicing machine, food articles are loaded onto a lift tray and the lift tray is raised to a ready-to-sweep position. Loaf grippers are retracted after the previous food articles are sliced. During retraction of the loaf grippers, loaf-to-slicing blade gate doors are closed and ends of the previous food articles are dropped through a loaf end door. After the grippers have reached the retracted position or "home position" remote from the slicing blade, a loaf sweep mechanism is activated, moving the food articles laterally together into the slicing position. A spacing mechanism moves down and spaces the food articles apart. The grippers then advance after it has been determined that the loaf sweep mechanism has moved the food articles to the slicing position. The grippers have onboard sensing mechanisms that are triggered by contact with the food articles. After sensing and gripping the food articles, the food articles are retracted slightly, and the loaf-to-slicing blade gate doors are opened and the food articles are advanced to the slicing plane of the slicing blade. The loaf sweep mechanism retracts and the loaf lift tray lowers, ready for the next reload cycle. According to this design, in practice, the reload cycle is accomplished in about eight seconds. In a high volume slicing operation, reload cycle time can be a significant limitation to optimum production efficiency.

The machine disclosed in WO 2010/011237 A1 provides an automated, food article tray loading method and apparatus wherein food articles can be loaded into the lift tray into designated and separated lanes which automatically assume a preload condition, and after the food articles are loaded, food article separation is maintained on the lift tray. A food article transfer receives the food articles on the lift tray in their separated positions and transfers the food articles into the slicing feed paths while maintaining the separated positions. A food article end disposal system utilizes a transport that laterally moves end portions outside of the feed path and ejects the end portions as the transport is moved back into the feed path to receive the subsequent end portions. The machine utilizes food article grippers that are fixed onto conveyor belts which support and drive the food articles in the feed paths.

The present inventors have recognized that it would be desirable to slice plural food articles with independent feeding and weighing capabilities, with hygienic and operational enhancements.

SUMMARY OF THE INVENTION

The invention provides a mechanism and method for slicing multiple food articles with independency of feed rate and the ability to weigh each product group from each food article respectively to achieve optimal weight control and yield of each food article.

The present invention provides a high speed slicing apparatus and a weighing and classifying conveyor combination that provides plural advantages in machine cost, productivity, food hygiene, and operation.

The invention provides a lift tray that is located in line with the food article feed paths and is lowered to receive food articles and raised into the feed paths. There is no need for lateral shifting of food articles into the feed paths. Food article grippers are driven along the feed paths by an overhead conveyor. A laser food article end detection system is employed in each feed path to detect the terminal end of the food article to control the positioning of the gripper for that path.

The invention provides the use of an automatic debris or scrap removal conveyor that also provides for end portion removal.

The invention provides an automated cleanup position wherein the elevated food article feed mechanism can be collapsed to a more convenience plane or maintenance position, and the blade cover is automatically pivoted to a cleanup position.

The combination provides for enhanced portion control and yield. A food article feed mechanism ensures accurate feeding by the use of servo driven and controlled feed belts and grippers. The slicing mechanism includes three independent drives for slicing multiple food articles simultaneously.

An improved food article stop gate is provided that also serves as a door for the removal of food article end portions.

A horizontally radiating laser intrusion detector is used to shut down systems when an unwanted intrusion by an operator is detected.

An automated, food article tray loading method and apparatus is provided wherein food articles can be loaded into the lift tray into designated and separated lanes which automatically assume a preload condition, and after the food articles are loaded, food article separation is maintained on the lift tray.

Numerous other advantages and features of the present invention will become readily apparent from the following detailed description of the invention and the embodiments thereof, and from the accompanying drawings.

DESCRIPTION OF THE PREFERRED EMBODIMENTS

Figure 1:
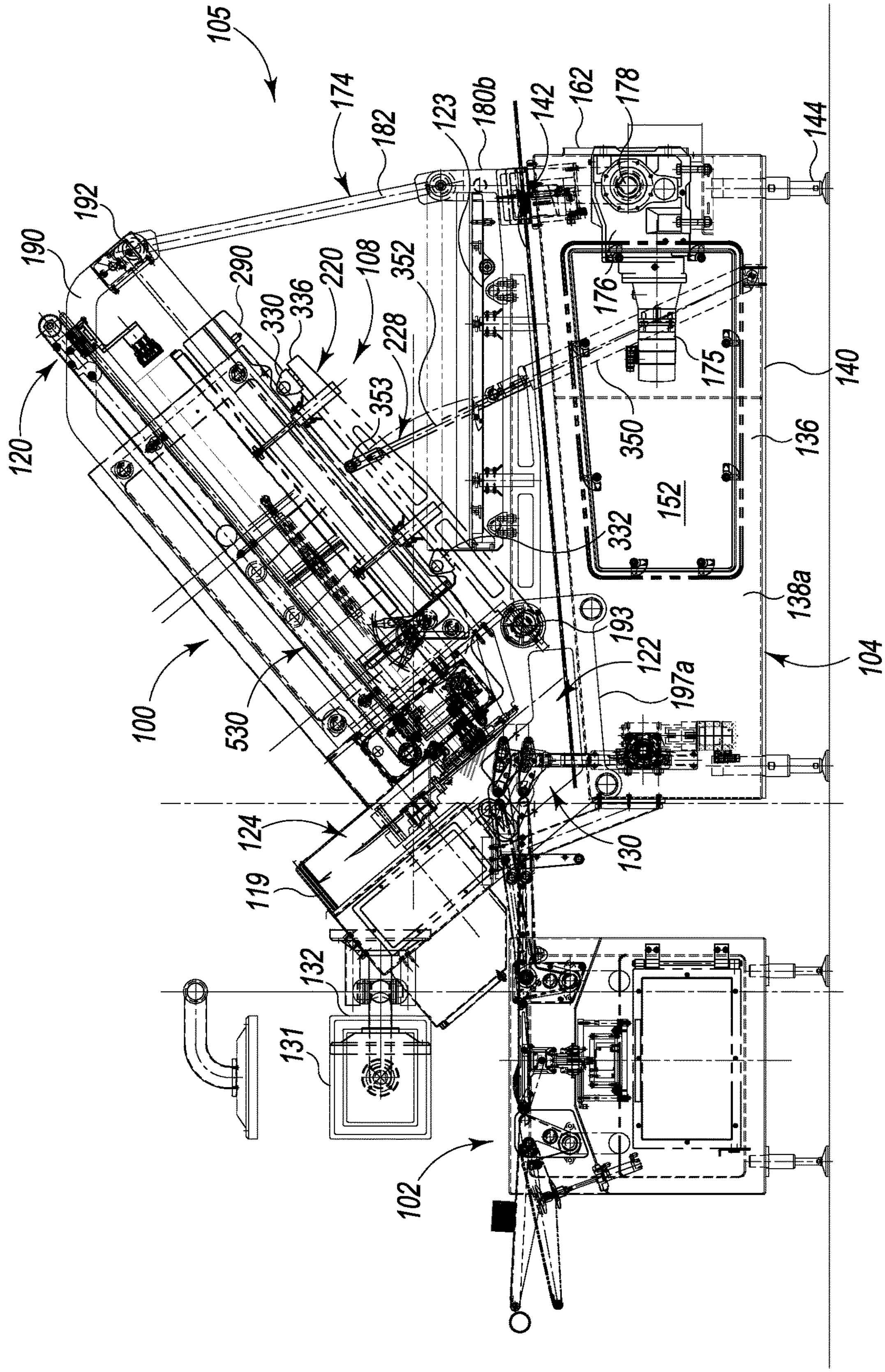
FIG. 1 is a near side elevational view of a slicing machine and a weighing and classifying conveyor combination of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Published Patent Application No. WO 2010/011237 and U.S. Pat. No. 5,628,237 are herein incorporated by reference.

Overall Description

Figure 2:
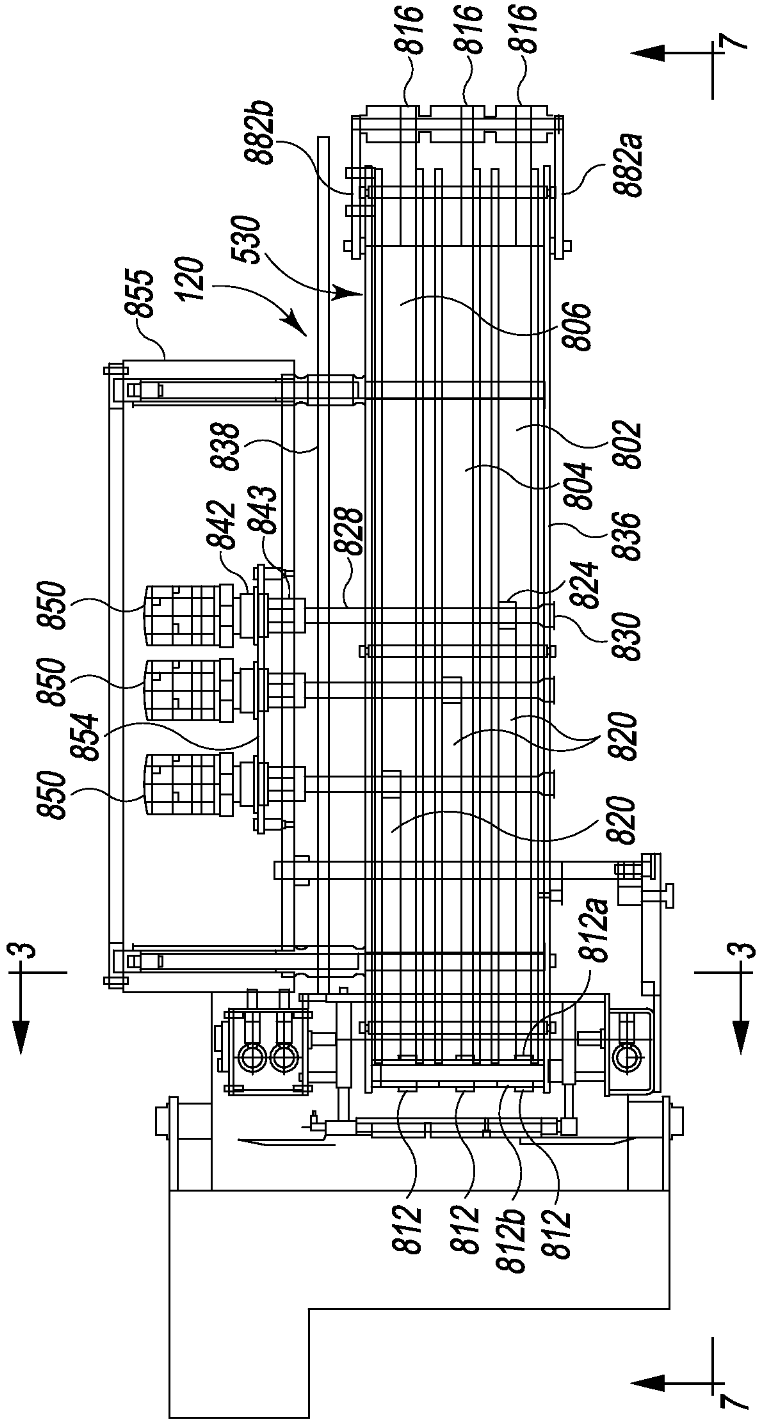
FIG. 2 is a plan view of the combination of FIG. 1 with some panels and parts removed or made transparent illustrating some underlying components.
Figure 2A:
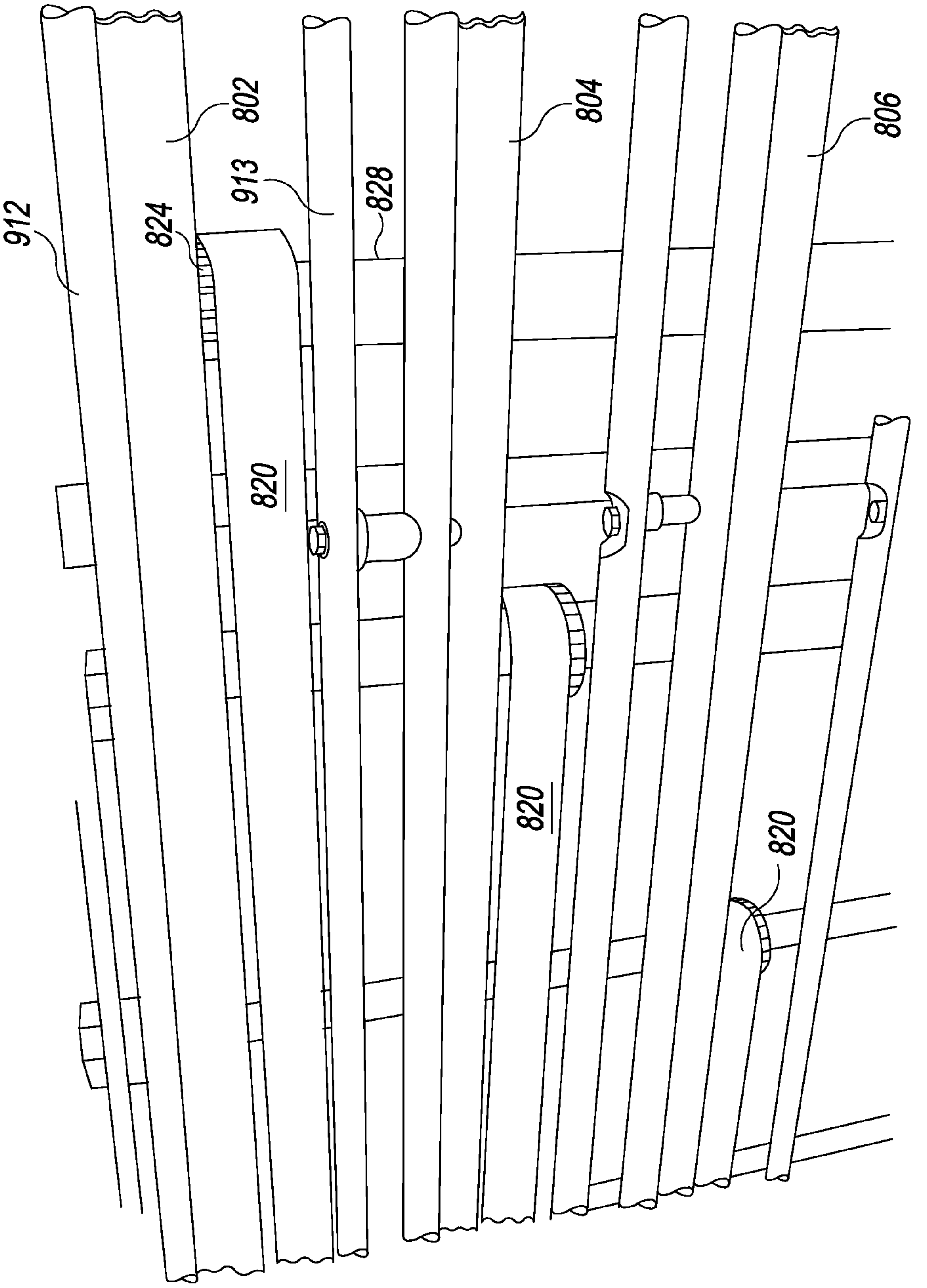
FIG. 2A is a bottom perspective view of a portion of FIG. 2.
Figure 3:
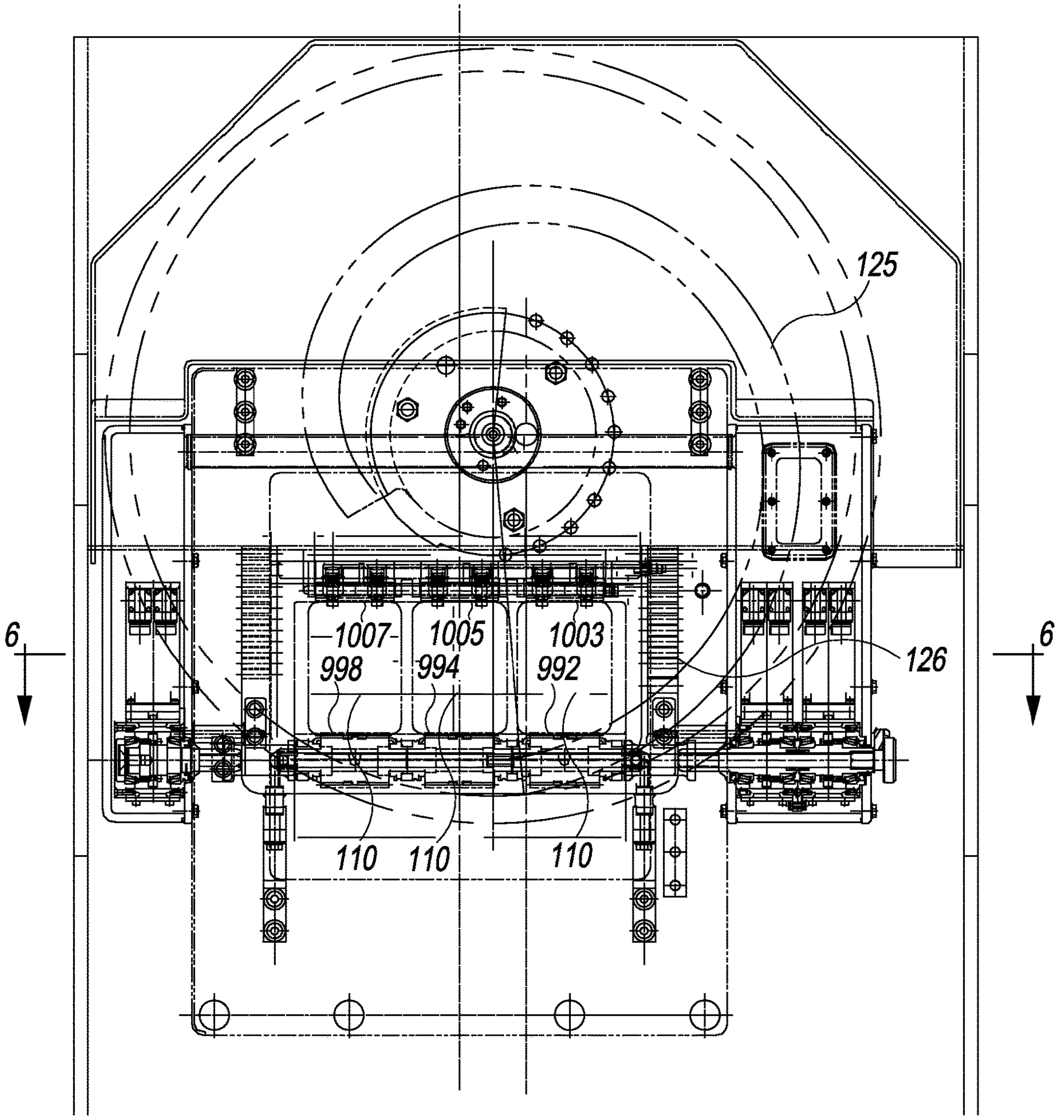
FIG. 3 is a sectional view taken generally along line 3-3 of FIG. 2 with some panels and parts removed or made transparent and underlying components revealed.

FIGS. 1-3 illustrate a high speed slicing apparatus 100 and a weighing and classifying conveyor or output conveyor 102 according to a preferred embodiment of the invention. The slicing apparatus 100 includes a base section 104, a collapsible frame 105, an automatic food article loading apparatus 108 that receives food articles 110 to-be-sliced, a food article feed apparatus 120, a food article end and scrap removal conveyor 122 (FIGS. 13C and 13D), a laser safety guard system 123, a slicing head apparatus 124, and a slice receiving conveyor 130. The slicing head apparatus includes a slicing blade 125 that defines a slicing plane and a orifice plate or slicing block 126 that guides food articles into the slicing plane, the blade cutting closely to the orifice plate. The slicing apparatus also includes a computer display touch screen 131 that is pivotally mounted on and supported by a support 132.

Base Section

The base section 104 includes a compartment 136 having side walls 138*a*, 138*b*, a bottom wall 140, and an inclined top wall 142. The apparatus 100 is supported on four adjustable feet 144. The compartment 136 has a tapered side profile from back to front wherein the top wall 142 slants down from back to front. The slanted orientation of the top wall 142 ensures water drainage off the top of the compartment 136. The compartment is supported on adjustable feet 144.

The compartment 136 includes a near side door 152, a far side door 156 (FIG. 9), and a rear door 162 that permit access into the compartment or to modules normally held within the compartment 136. The compartment 136 typically affords an enclosure for a computer, motor control equipment, a low voltage supply, and a high voltage supply and other mechanisms as described below. The compartment may also include a pneumatic supply or a hydraulic supply, or both (not shown).

Collapsible Frame and Elevated Housings

Figure 1A:
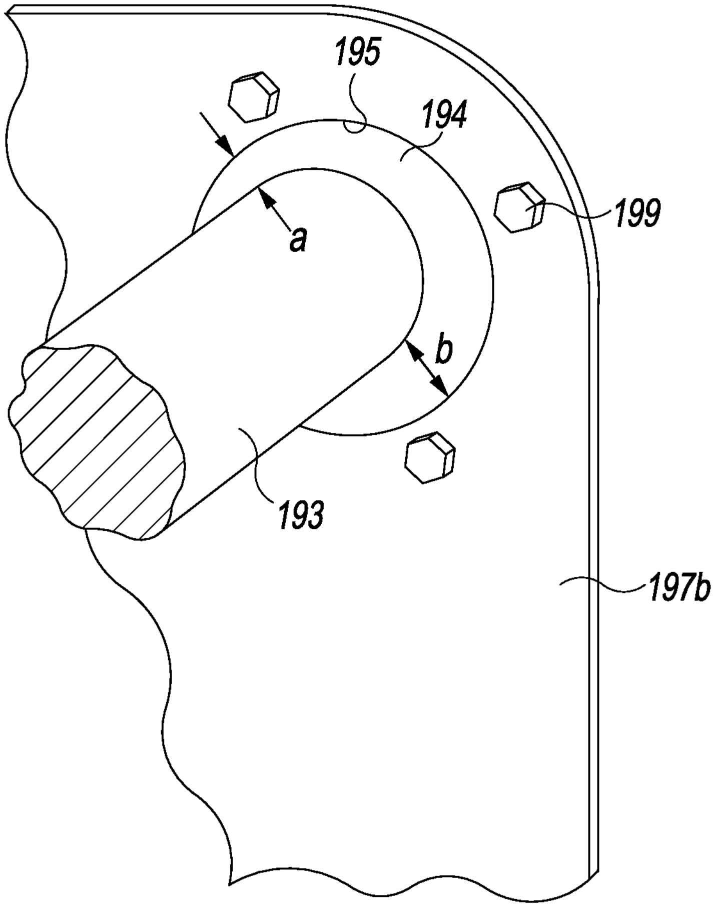
FIG. 1A is an enlarged fragmentary view taken from FIG. 1.
Figure 1B:
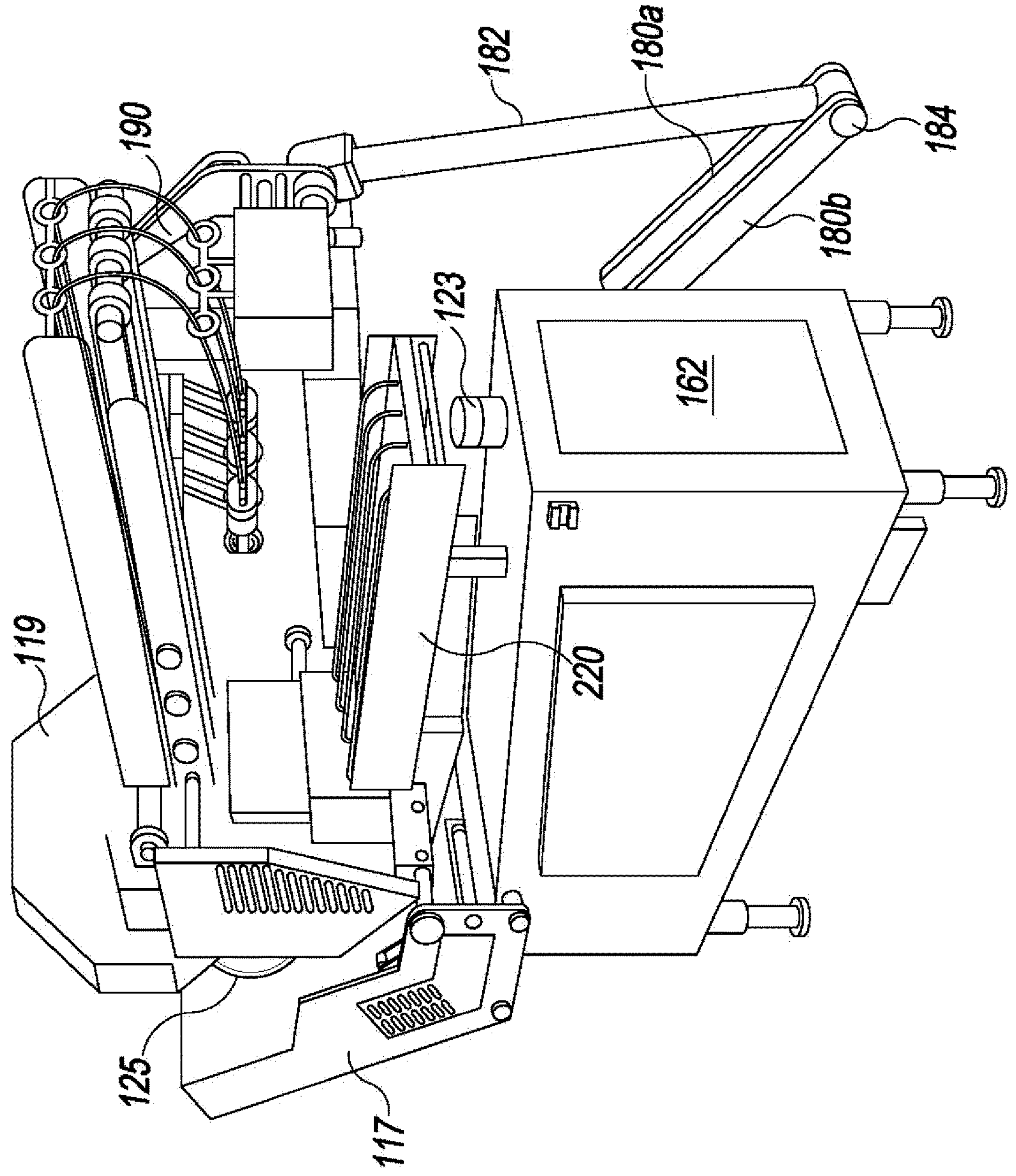
FIG. 1B is a perspective view of the slicing machine of FIG. 1 in a clean-up configuration.
Figure 9:
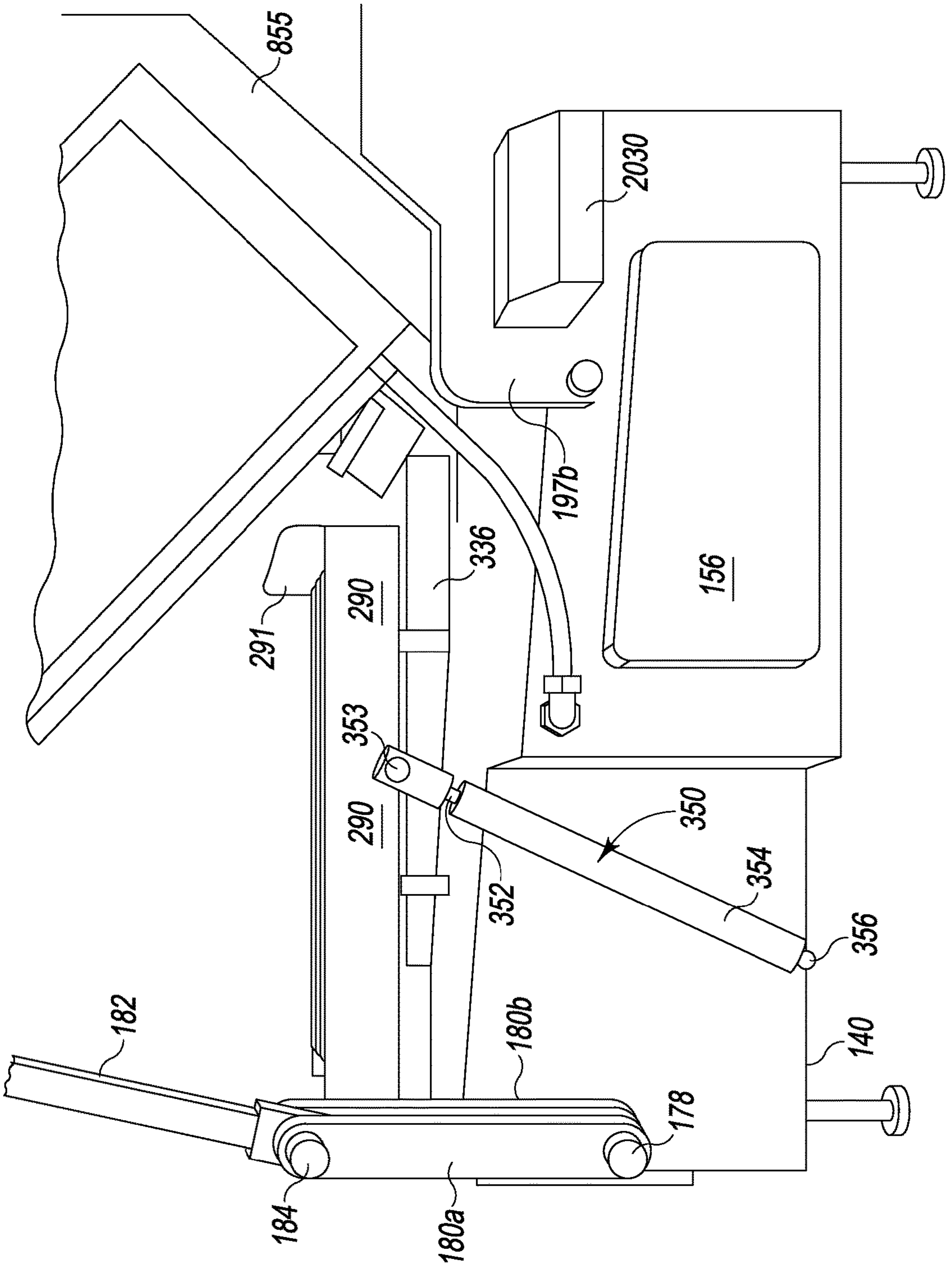
FIG. 9 is a far side perspective view of the apparatus of FIG. 1 with a lift tray in a lowered position.

The base section 104 supports the collapsible frame 105 as shown in FIGS. 1, 1B and 9. The collapsible frame 105 includes a foldable support mechanism 174 that supports a food article feed mechanism frame 190.

The foldable support mechanism 174 includes a servomotor 175 that drives a gear reducer 176 having a drive shaft

178 that extends out of far side of the compartment 136 (FIG. 9). The drive shaft 178 is rotationally fixed to parallel levers 180*a,* 180*b* which swing out with a turning of the drive shaft 178. The levers 180*a,* 180*b* are pivotally connected to a column 182 via a rotary connection 184. The column 182 is pivotally connected at a pivot connection 192 to the frame 190 which supports the food article feed apparatus 120.

For cleaning and maintenance purposes, the collapsible frame 105 is collapsed down by actuating the servomotor 175 and gear reducer 176 to rotate the levers 180*a,* 180*b,* which draws down the column 182 as shown in FIG. 1B. The frame 190, and all equipment supported thereby, is lowered for more convenient maintenance and cleaning as illustrated in FIG. 1B. In some cases this eliminates the need for ladders or platforms when servicing the slicing apparatus 100.

The slicing head 124 is covered by a guard 119 that is attached to the frame 190 such that when the frame is pivoted down as shown in FIG. 1B, the guard 119 is pivoted away from a slicing head base 117 to expose the slicing blade 125 and internals for cleaning and maintenance.

Additionally, the elevation of the food article feed apparatus can be adjusted by using the servomotor to selectively pivot the levers 180*a*, 180*b* and lower the rear of the frame 190. At a front, the frame 190 is supported on a cross shaft 193 that is eccentrically fixed at each end to a round cam 194 (FIG. 1A). The cam is journaled in a round opening 195 in side supports 197*a*, 197*b* and the cam is fixed for non-rotation to the respective side support by fasteners 199. The far side is shown in FIG. 1A, with the understanding that the near side is mirror image identical across the longitudinal vertical center plane of the machine. As shown in FIG. 1A, because the dimension "a" is smaller than the dimension "b", the shaft ends can be temporarily loosened by removing the fasteners and the shaft and cams can be rotated 180 degrees about a centerline of the shaft, and the cams can be re-fastened to be fixed to the side supports. The elevation will be different between the two 180-degree adjustable positions. Thus, the machine will accommodate two different height settings for different types of food articles.

Food Article Feed Apparatus

An upper conveyor assembly 530 of the food article feed apparatus 120 is shown in FIG. 2. The conveyor assembly 530 includes three independently driven endless conveyor belts 802, 804, 806. Each belt 802, 804, 806 is identically driven so only the drive for the belt 802 will be described.

The belt 802 is wrapped around a toothed front drive roller or pulley 812 and a back idler roller or pulley 816. The belt 802 preferably has teeth that engage teeth of the two rollers 812, 816. Each drive roller 812 includes a toothed outer diameter 812*a* and a toothed, recessed diameter 812*b.*

An endless drive belt 820 wraps around the recessed diameter 812*b*. The drive belt 820 also wraps around a drive roller 824 that is fixed to a drive shaft 828. The drive shaft 828 extends transversely to the belt 802 and is journaled for rotation within a bearing 830 mounted to a near side frame member 836.

The drive shaft 828 penetrates a far side frame member 838 and extends to a bearing 843, coupled to a gear reducer 842 mounted to a support frame 854. The gear reducer 842 is coupled to a servomotor 850 that is mounted to the support frame 854.

The servomotor 850 drives the drive shaft 828 which turns the roller 824 which circulates the belt 820 which rotates the roller 812 which circulates the belt 802.

Three servomotors 850 are mounted to the support frame 854 and all are located within an upper compartment 855 that is supported by the frame 190.

Figure 7:
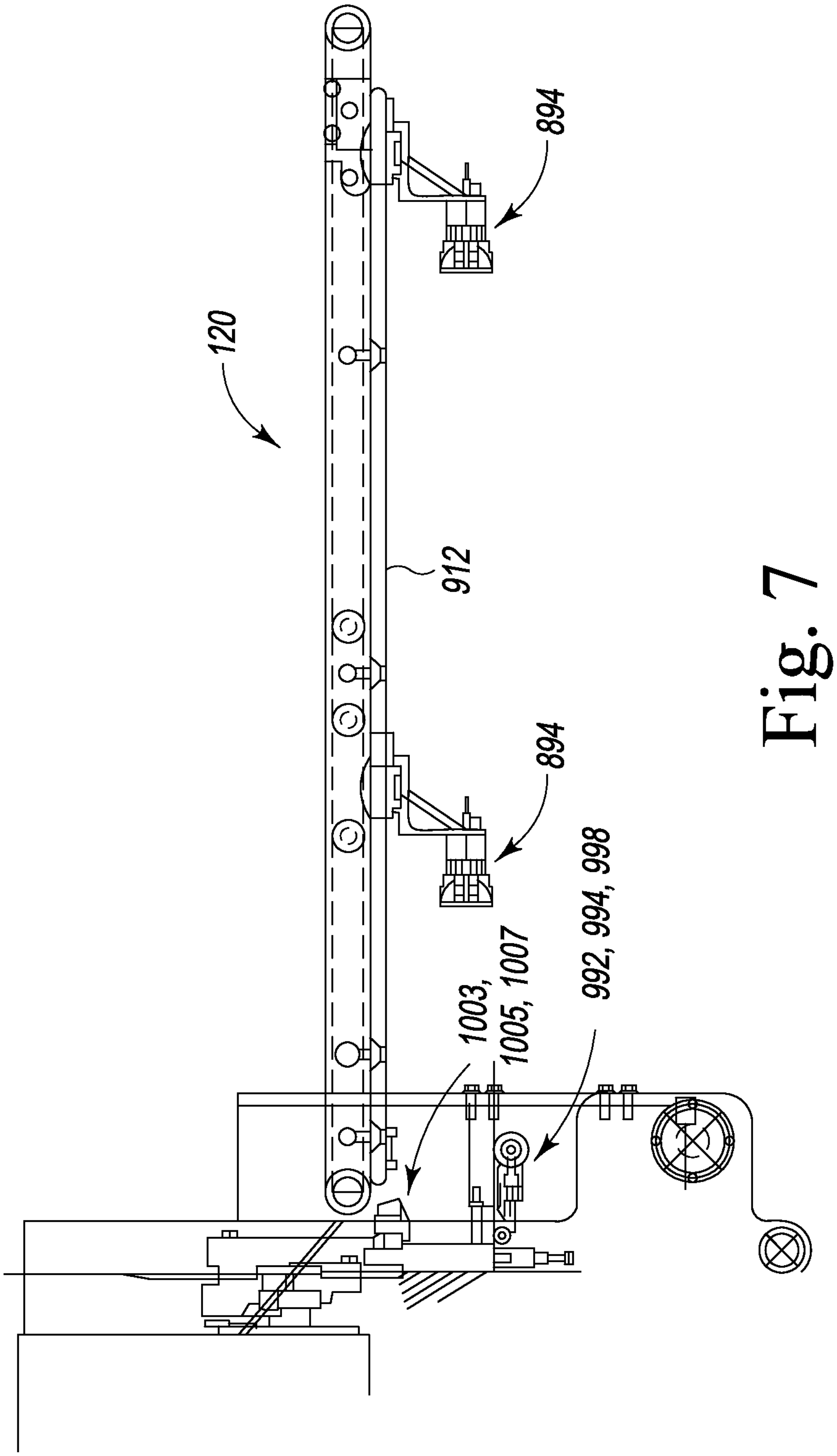
FIG. 7 is a fragmentary elevational view taken generally along line 7-7 of FIG. 2 with some panels and parts removed or made transparent and underlying components revealed.
Figure 7A:
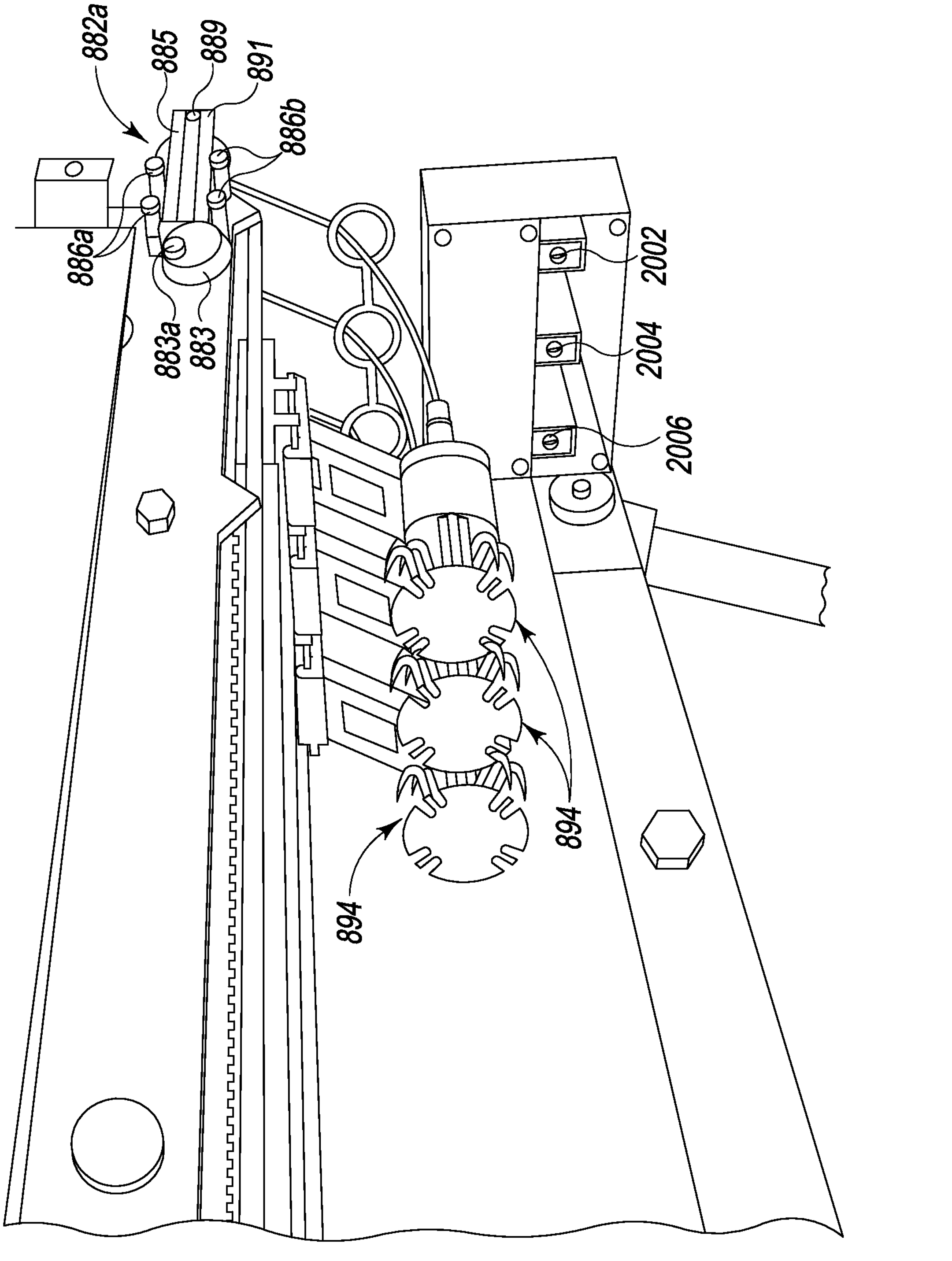
FIG. 7A is a fragmentary perspective view of a portion of FIG. 7.

The idler rollers 816 are provided with a pair of mirror image identical adjustable cam belt tension adjustment mechanisms 882*a,* 882*b*. As shown in FIG. 7A, each mechanism 882*a,* 882*b* includes a fork 885 that is braced from the respective side frame member 836, 838 by an adjustable cam 883. The fork 885 is guided by upper and lower pins 886*a,* 886*b* so as to slide rearward and forward and has an end 891 that captures an axle 889 that rotationally supports the idle rollers 816. For adjustment, the cam fastener 883*a* is loosened so as to be rotatable on the respective side frame member 836, 838, rotated to achieve the desired belt tension, and then the cam fastener is tightened to hold the cam fixed.

Figure 7B:
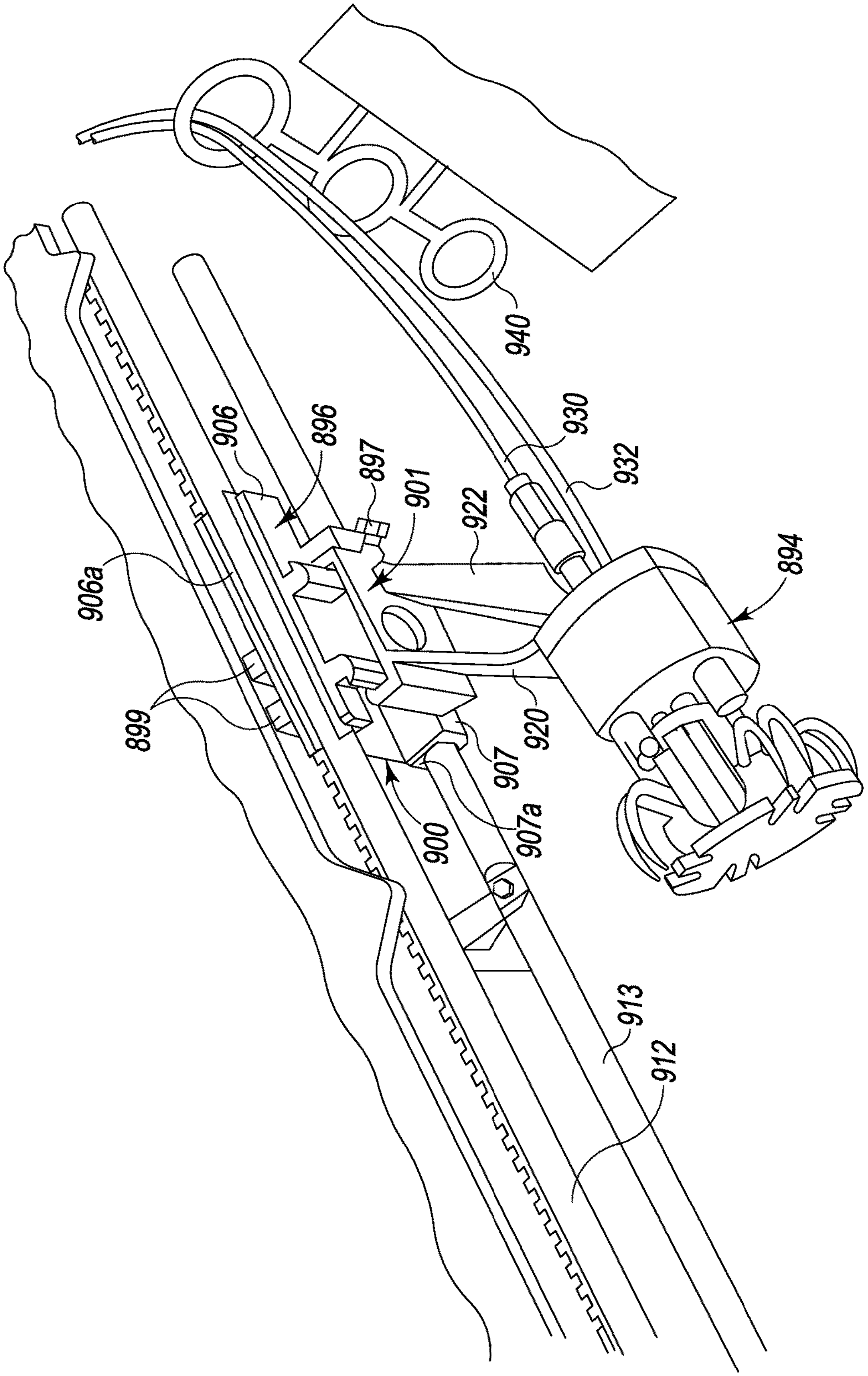
FIG. 7B is an enlarged fragmentary view of apportion of FIG. 7A.
Figure 7C:
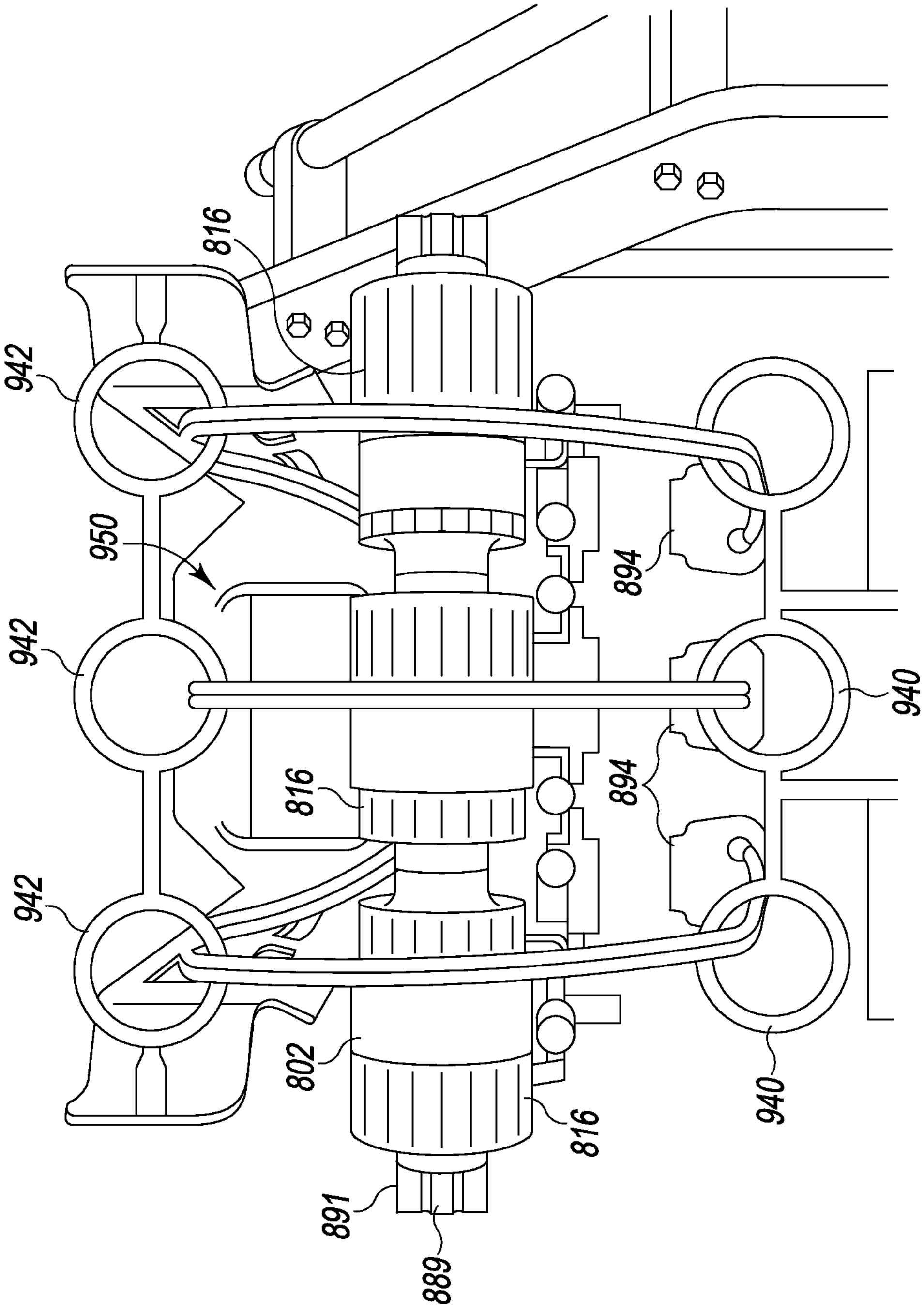
FIG. 7C is an enlarged rear perspective view of a portion of FIG. 7.
Figure 7D:
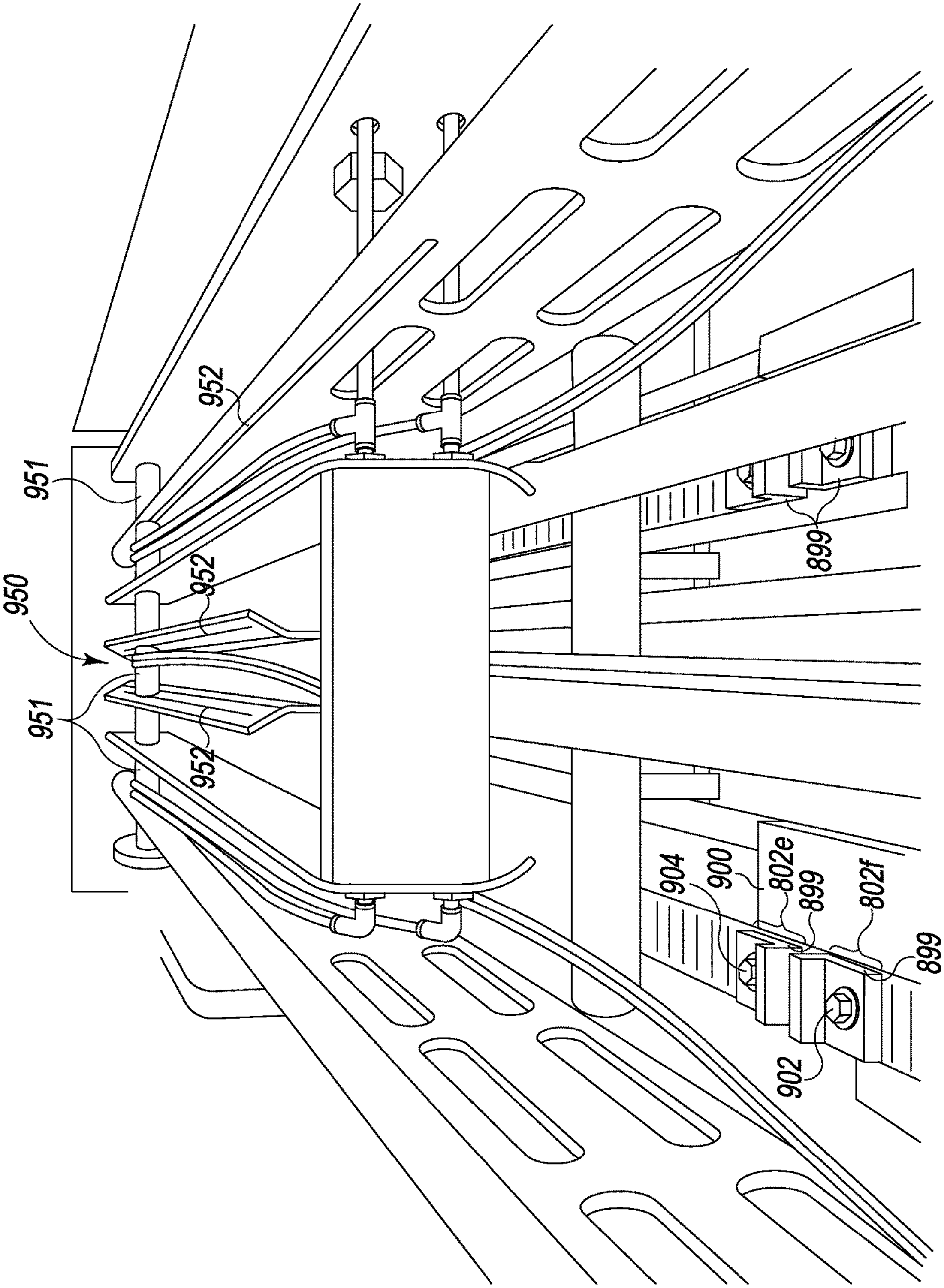
FIG. 7D is a top perspective view of a portion of FIG. 7.

FIG. 7B illustrates a gripper 894 used in cooperation with the belt 802. The gripper 894 is mounted to a bottom run of the belt 802 and is translated along the food article path by the belt 802. The gripper 894 is clamped to a belt joint and guide assembly 896 by a fixture 901 that engages the assembly 896 and is fixed thereto by a clamping set screw 897. The assembly 896 comprises a pair of upper members 899 and a lower member 900. The upper members 899 can include teeth 899*a* that mesh engage the teeth of the belt 802 once the members 899, 900 are fastened together to splice the free ends 802*e,* 802*f* of the belt 802 (FIG. 7D). For clamping, fasteners 902, 904 (FIG. 7D) are provided which are inserted from above the members 899 through plain holes in the members 899 and tightly threaded into threaded holes in the member 900.

The lower member 900 includes guides 906, 907 that contain slide bearings 906*a*, 907*a* composed of friction reducing material. The slide bearings 906*a*, 907*a* partly surround longitudinal rails 912, 913 that are in parallel with, and straddle the belt 802. The rails 912, 913 support the gripper along its working path from a retracted position to a fully forward position near to the slicing plane.

For each gripper there are two rails 912, 913 to support and guide that gripper. Thus, there are two rails that straddle the belt 804 and two rails that straddle the belt 806.

The gripper 894 is connected to the fixture 901 by a front plate 920 having a predominant lateral face and a rear plate 922 having a predominant longitudinal face. Each gripper 894 is provided with two air lines 930, 932 for two way pneumatic gripper open-and-close operability.

The air lines 930, 932 are guided through lower rings 940 and upper rings 942 to an air tube storage area 950 above the food article feed apparatus 120 (FIG. 7D). The air tube lines are routed around weighted rollers or slides 951 that are guided by longitudinal slots 952 and extend to a source of pressurized air. Thus, the movement of the rollers or slides along the slots under force of gravity, will take up slack in the air tubes when the grippers 894 are moving toward, and when in, the retracted position.

The gripper 894 travels from the retracted home position shown in FIG. 7A to the advanced, forward position approaching the slicing plane.

The grippers 894 are as described in Published Patent Application No. WO 2010/011237, herein incorporated by reference.

Lower Conveyor

As illustrated in FIGS. 3, 6, 7, and 7E at a front end of the food article feed apparatus 120, are three lower feed conveyors 992, 994, 998, having endless belts 1002, 1004, 1008, respectively. The endless belts 1002, 1004 1008 are independently driven and are directly opposed to presser plates 1003, 1005, 1007 respectively.

Figure 6:
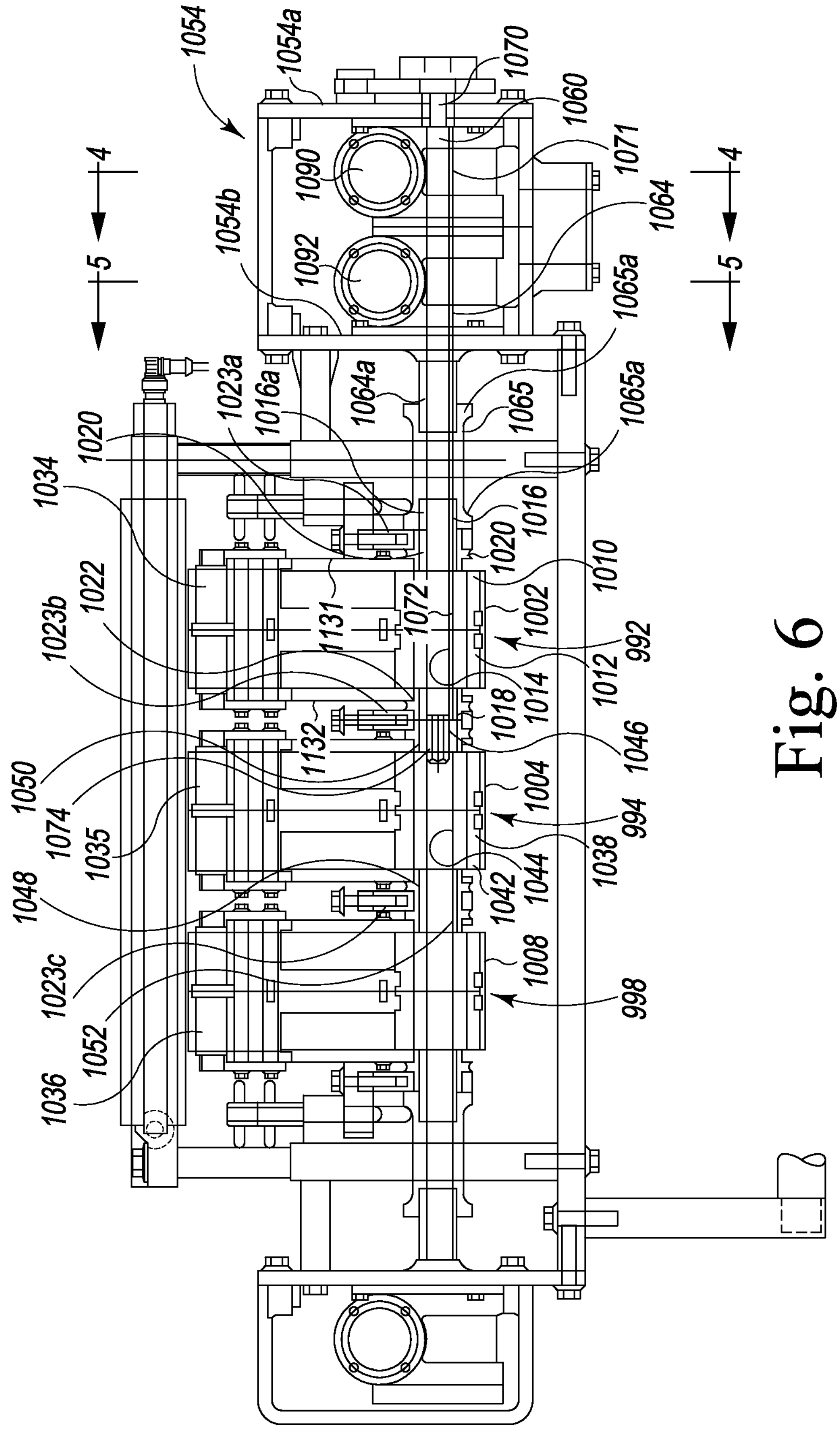
FIG. 6 is a sectional view taken generally along line 6-6 of FIG. 3 with some panels and parts removed or made transparent and underlying components revealed.

FIG. 6 shows the conveyor 992 has a drive roller 1010 having a central hub 1012 with a central bore 1014. The drive roller 1010 has tubular stub axles 1016, 1018 extending from opposite ends of the central hub 1012. The tubular stub axles 1016, 1018 are journaled for rotation by bearings 1020, 1022 that are fastened to carrier blocks 1023*a*.

The conveyor 994 includes a drive roller 1038 having a central hub 1042 with a bore 1044. The drive roller 1038 has tubular stub axles 1046 and 1048 extending from opposite ends of the central hub 1042. The tubular stub axles 1046, 1040 are journaled by bearings 1050, 1052 respectively that are attached to carrier blocks 1023*b*.

A motor housing 1054, including a base plate 1054*b* and a cover 1054*a*, is mounted to an end of an upper conveyor support bar 1056. The base plate 1054*b* of each side of the machine is fastened to a linear actuator, such as a pneumatic cylinder 1055*a* and 1055*b* respectively. The cylinders 1055*a*, 1055*b* are connected together by the support bar 1056. Each cylinder slides on a fixed vertical rod 1057*a*, 1057*b* respectively. Thus, controlled air to the cylinders 1055*a*, 1055*b* can be used to uniformly raise or lower the near side motor housing 1054 and the far side motor housing 1054 uniformly.

A spindle 1060 extends through the motor housing 1054, through a sleeve 1064, through a coupling 1065, through the tubular stub axle 1016, through the central bore 1014, through the tubular stub axle 1018, through the tubular stub axle 1046, and partly into the bore 1044. The spindle 1060 has a hexagonal cross-section base region 1070, a round cross-section intermediate region 1072, and a hexagonal cross-section distal region 1074. The hexagonal cross-section base region 1070 is locked for rotation with a surrounding sleeve 1071 to rotate therewith.

The intermediate region 1072 is sized to pass through the sleeve 1064, through the tubular stub axle 1016, through the central bore 1014, and through the tubular stub axle 1018 to be freely rotatable therein. The distal region 1074 is configured to closely fit into a hexagonal shaped central channel 1078 of the tubular stub axle 1046 to be rotationally fixed with the tubular stub axle 1046 and the drive roller 1038.

The sleeve 1064 includes a hexagonal perimeter end 1064*a* that engages a hexagonal opening 1065*a* of the coupling 1065. The coupling 1065 includes an opposite hexagonal opening 1065*a* that engages a hexagonal perimeter end 1016*a* of the tubular stub axle 1016. The coupling 1065 couples the sleeve 1064 and the stub axle 1016 for mutual rotation such that the sleeve 1064 and the drive roller 1010 are locked for rotation together, i.e., turning of the sleeve 1064 turns the drive roller 1010.

Figure 4:
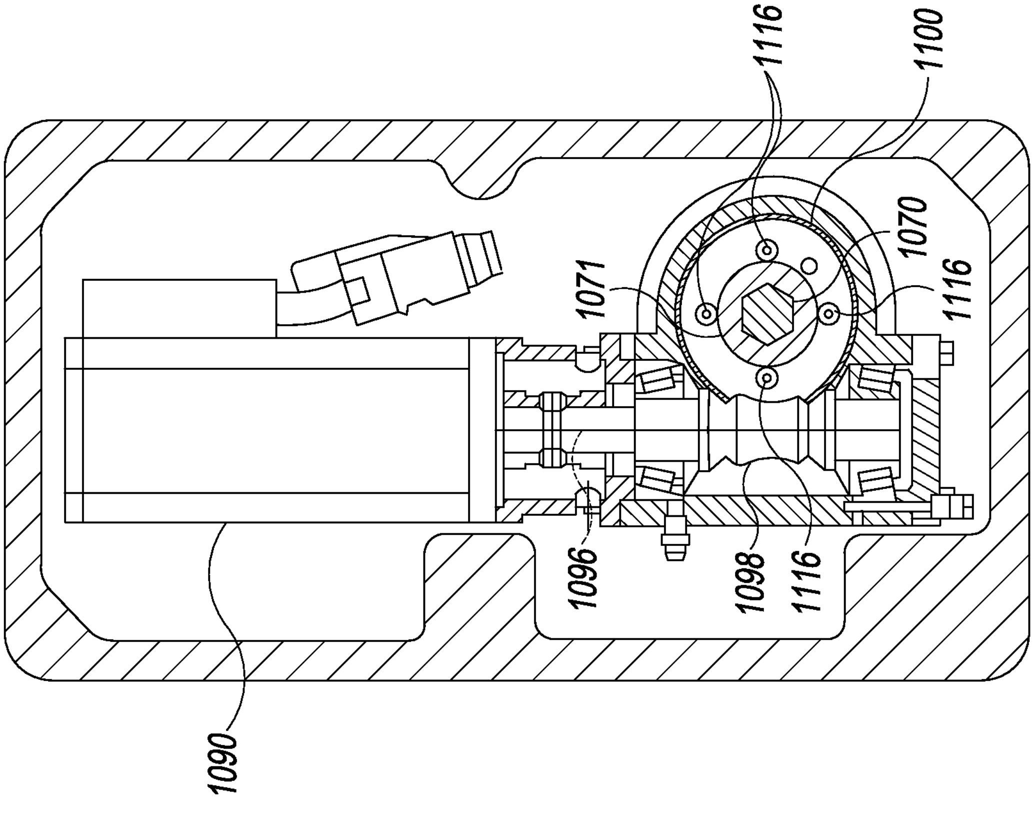
FIG. 4 is a schematic, sectional view taken generally along line 4-4 of FIG. 6 with some panels and parts removed or made transparent and underlying components revealed.

Within the motor housing 1054 are two servomotors 1090, 1092 mounted to the housing by fasteners. As shown in FIGS. 4 and 6, the servomotor 1090 has a vertically oriented output shaft 1096 that rotates about a vertical axis connected to a worm gear 1098 that is enmesh with and drives a drive gear 1100 that rotates about a horizontal axis. The drive gear 1100 drives the sleeve 1071 that drives the region 1070 of the spindle to rotate the spindle 1060. Rotation of the spindle 1060 rotates the drive roller 1038 via the hexagonal cross-section distal end region 1074.

Figure 5:
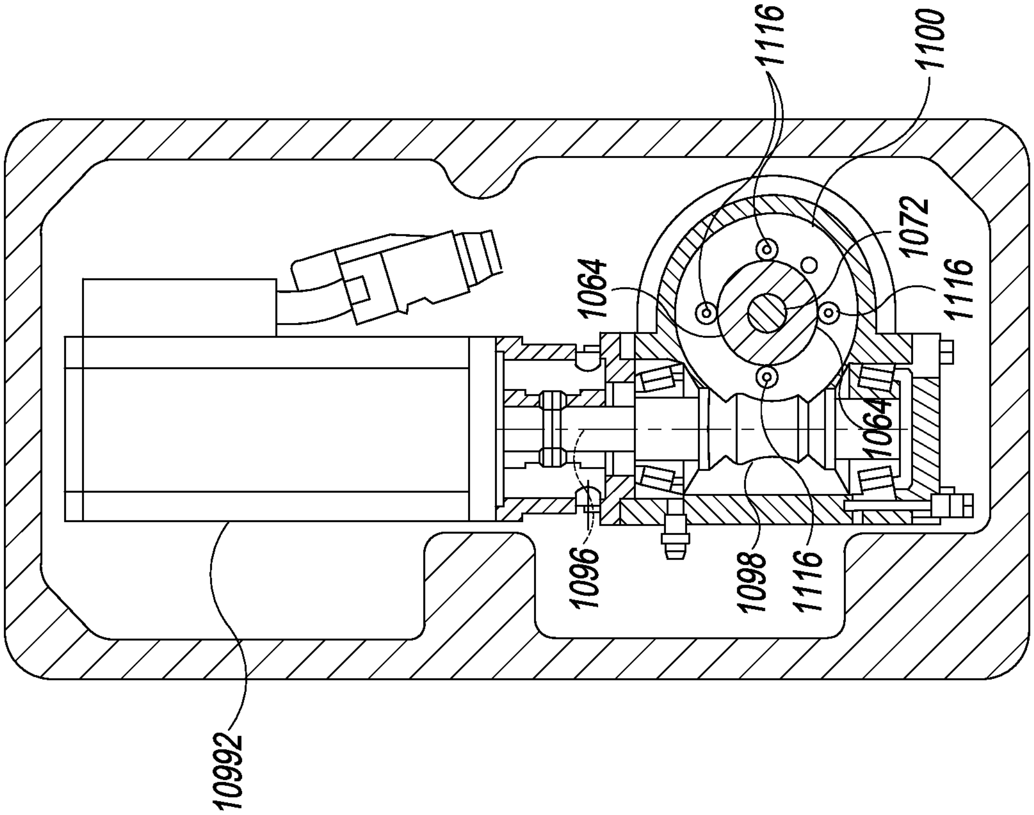
FIG. 5 is a schematic, sectional view taken generally along line 5-5 of FIG. 6 with some panels and parts removed or made transparent and underlying components revealed.

Adjacent to the servomotor 1090 is the servomotor 1092. The servomotor 1092 is configured substantially identically with the servomotor 1090 except the worm gear 1098, as shown in schematic form in FIG. 5, of the servomotor 1092 drives a drive gear 1100 that drives the sleeve 1064 to rotate. The sleeve 1064 rotates independently of the round cross-section region 1072 of the spindle 1060, and drives a stub axle 1016 to rotate, which rotates the drive roller 1010.

The sleeves 1071 and 1064 are journaled for rotation by bearings. The drive gears 1100, 1100 are fastened to the respective sleeve 1071, 1064 using fasteners 1116.

Each conveyor belt 1002, 1004, 1008 is wrapped around the respective drive roller and a front idle rollers 1134, 1135, 1136 that is supported by respective side frames 1131, 1132.

Figure 7E:
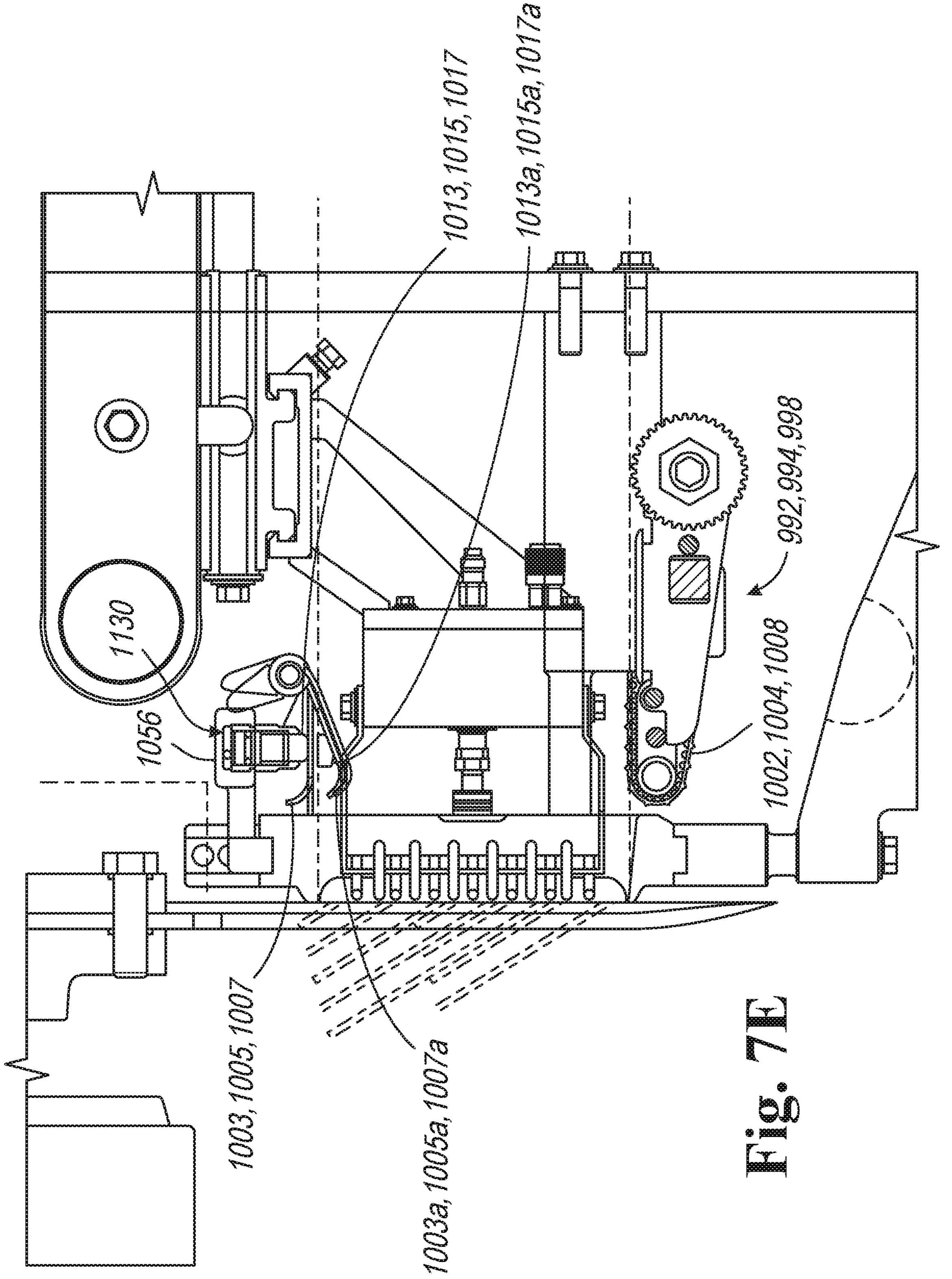
FIG. 7E is an enlarged fragmentary view of a portion of FIG. 7.

Also, as shown in FIGS. 7, 7E, and 13A-13C, the underside of the support bar 1056 carries pneumatic cylinders 1130. Each pneumatic cylinder 1130 is supplied with a preselected air pressure to extend a piston rod 1013, 1015, 1017 to press down on presser plates 1003, 1005, 1007 to lightly press down on a top of the product below, clamping the food article between the presser plates 1003, 1005, 1007 and the belts 1002, 1004, 1008. Piston rods 1013*a*, 1015*a*, 1017*a* in their extended position and presser plates 1003, 1005, 1007, in their depressed position 1003*a*, 1005*b*, 1007*a* are illustrated in FIG. 7E. The conveyor belts 1002, 1004, 1008 drive the food articles through corresponding orifices in the slicing block and into the slicing plane.

Figure 7F:
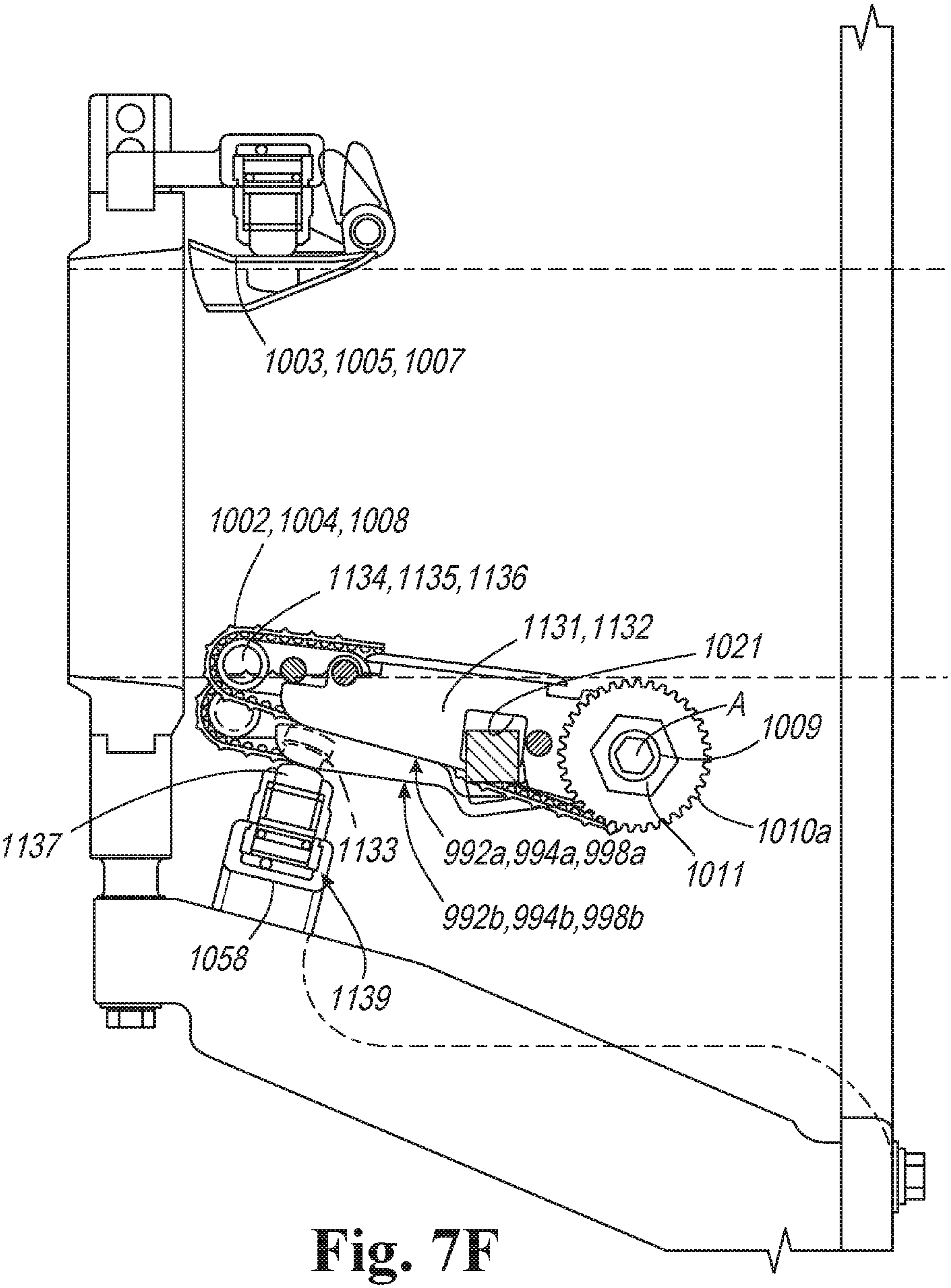
FIG. 7F is an enlarged fragmentary view of an alternate embodiment of a lower conveyor.

FIG. 7F illustrates an alternate embodiment of the lower conveyor. The same reference signs indicate similar parts as described above. In the embodiment illustrated in FIG. 7F, the lower conveyor 992*a*, 994*a*, 998*a* is pivotable about an axis A parallel to the central axis of a drive roller 1010*a*. Each conveyor belt 1002, 1004, 1008 is wrapped around the respective drive roller and a front idle roller 1134, 1135, 1136 that is supported by respective side frames 1131, 1132. Side frames 1131, 1132 may be connected to a transverse bottom surface or bar 1133 which provides at least a region of contact for at least one piston rod 1137 disposed below the top surface of the conveyors. A support bar 1058 below the lower conveyors carries one or more pneumatic cylinders 1139, such as three pneumatic cylinders, supplied with a pre-selected air pressure, each of which extends a piston rod to pivot the lower conveyor about the pivot axis. Extension of the piston rods tilts the lower conveying surface towards presser plates 1003, 1005, 1007 to provide pressure in grasping the food product between the presser plates 1003, 1005, 1007 and the lower conveyor 992*a*, 994*a*, 998*a*. The tilt or pivot of the lower conveyor can be adjustable over a variable angular distance, such as 7 degrees. The lower conveyor 992*b*, 994*b*, 998*b* is illustrated in is lowered position.

The drive roller 1010*a* can be driven by a hexagonal shaft 1011 connected to a motor (not shown in FIG. 7F). Hexagonal shaft 1011 comprises a circular channel 1009 which allows the hexagonal shaft, and accordingly the drive roller 1010*a*, to pivot about the axis A of the circular channel 1009. A combination of multiple concentric hexagonal shafts with a circular channel for coupling about a circular shaft can be used to drive adjacent lower conveyors.

Side frames 1131, 1132 comprises an opening 1021 in the shape of an arc, which accommodates the cross-sectional dimensions of a support or alignment bar 1019, which can extend across the span of lower conveyors and intersect the side frames of each lower conveyor. The angular angle of the arc corresponds to the degree of angular movement of the lower conveyor.

Feed Paths

The illustrated apparatus provides three feed paths, although any number of paths are encompassed by the invention. The near side feed path is defined by the gripper 394 driven by the belt 802 which feeds the near side food article into the space between the conveyor belt 998 and presser plate 1007. The middle feed path is defined by the gripper 394 driven by the belt 804 which feeds the middle food article into the space between the conveyor 994 and the presser plate 1005. The far side fed path is defined by the gripper 394 driven by the belt 806 which feeds the far side food article into the space between the conveyor 992 and the presser plate 1003.

Food Article Loading Apparatus

As illustrated in FIG. 1, the automatic food article loading apparatus 108 includes a lift tray assembly 220, and a lift tray positioning apparatus 228. The lift tray assembly 220 receives food articles to-be-sliced. The tray positioning apparatus 228 pivots the tray assembly 220 to be parallel with, and below the food article feed apparatus 120 in a staging position.

Lift Tray Positioning Apparatus

Figure 8:
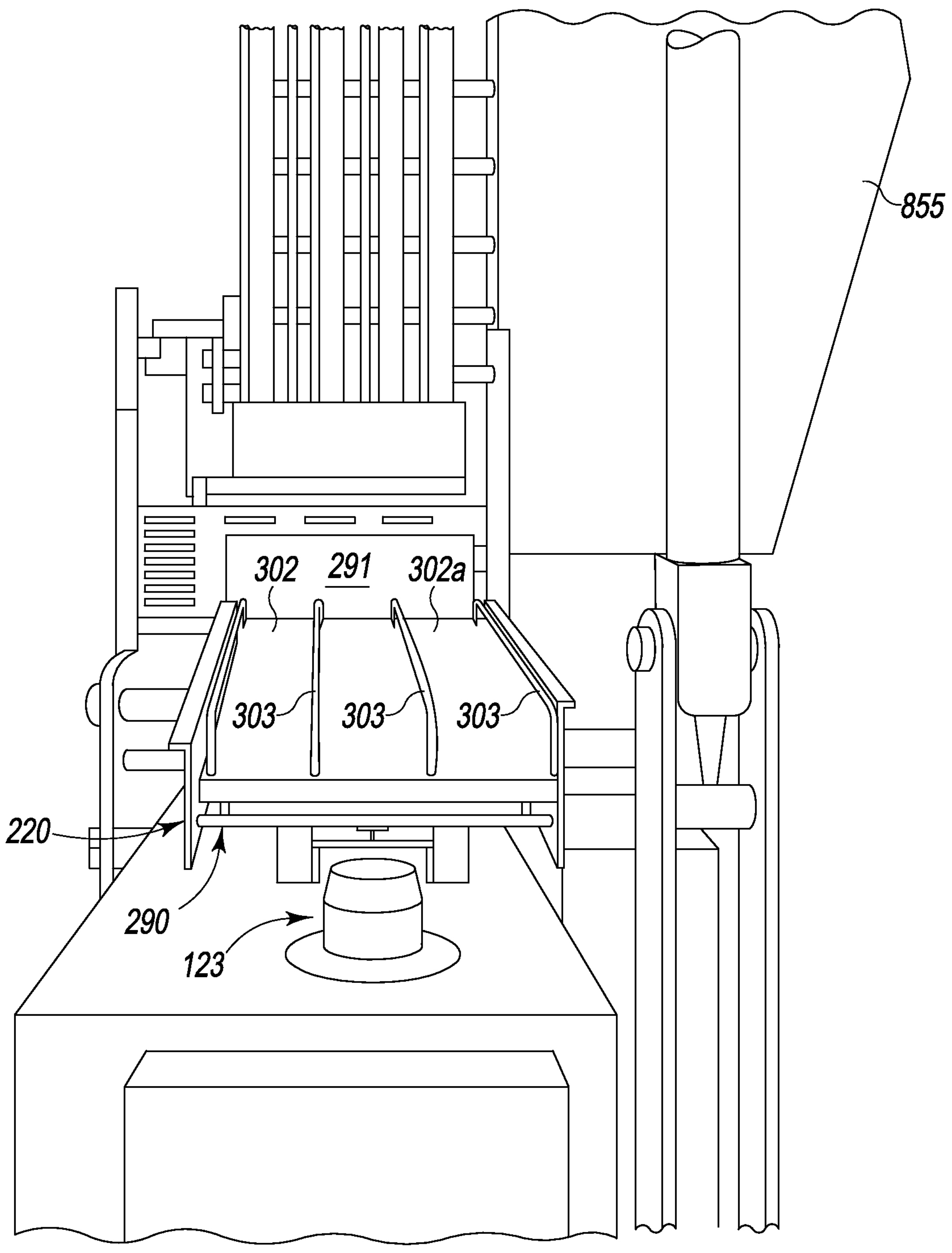
FIG. 8 is a fragmentary rear perspective view of the apparatus of FIG. 1.
Figure 10:
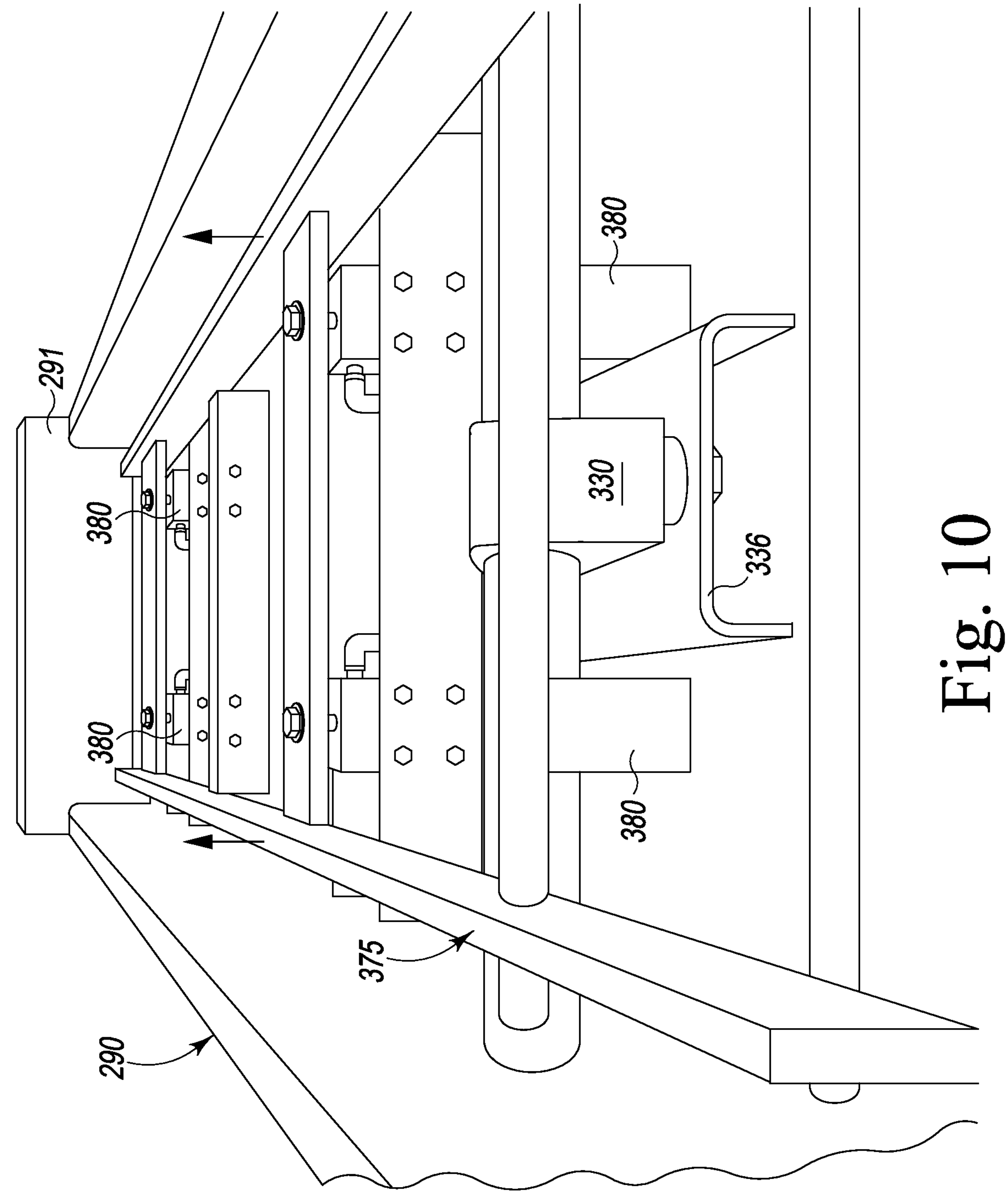
FIG. 10 is a top perspective rear view of the lift tray of FIG. 9 with a tray platform removed.

FIGS. 8-10 illustrate the food article lift tray assembly 220 includes a frame 290 that supports movable food article support tray 302. The tray 302 is removed in FIG. 10. The frame 290 includes an end plate 291. Food article are loaded onto the tray 302 until they abut the end plate 291. The tray 302 includes four spaced-apart guard rails 303 that define three lanes corresponding to three feed paths for the slicing machine.

As illustrated in FIGS. 1 and 10, the frame 290 is connected by a rear connection 330 and a front connection 332 to a lever 336. The lever 336 is pivotally mounted onto the shaft 193.

The tray positioning apparatus 228 includes a pneumatic or hydraulic, extendable cylinder 350 that has a rod 352 pivotally connected to the lever 336 or the frame 290 at a connection 353, and a cylinder body 354 pivotally connected to the floor 140 at a connection 356. Extension or retraction of the rod 352 pivots the lever 336 and frame 290 about the connection 342.

Lift Tray Assembly

As shown in FIG. 10, an inner frame 375 supports the tray 302 within the frame 290. The inner frame 375 is movable vertically with respect to the frame 290. The inner frame 375 is liftable by pneumatic cylinders 380 to an elevated position above the staging 20 position below the feed paths to lift the food articles to be in the food paths and to be gripped by the grippers. The cylinders 380 have rods connected to cross members of the frame 375 and cylinder bodies fastened to cross members of the frame 290. In the elevated position, the tray top surface 302*a* is just above the top of the end plate 291 so the food articles can be moved longitudinally off the tray 302.

Food Article Gate

As illustrated in FIG. 13A-13D a food article gate 2020 is operable to be used as a gate, to be used as a floor for supporting the food article, and to be used as a trap door to drop a food article remainder end through the trap door against a baffle 2022 and onto the scrap removal conveyor 122. The scrap removal conveyor 122 is also located below the cutting plane to dispose of shaving scrap caused by the blade on the food article during idle dwell periods.

The scrap removal conveyor 122 can be continuously circulated by use of a drum motor on one of the rollers. The conveyor delivers scrap to a discharge chute 2030 (FIGS. 13D and 9) where the scrap can be collected in a bucket or other means.

Figure 11:
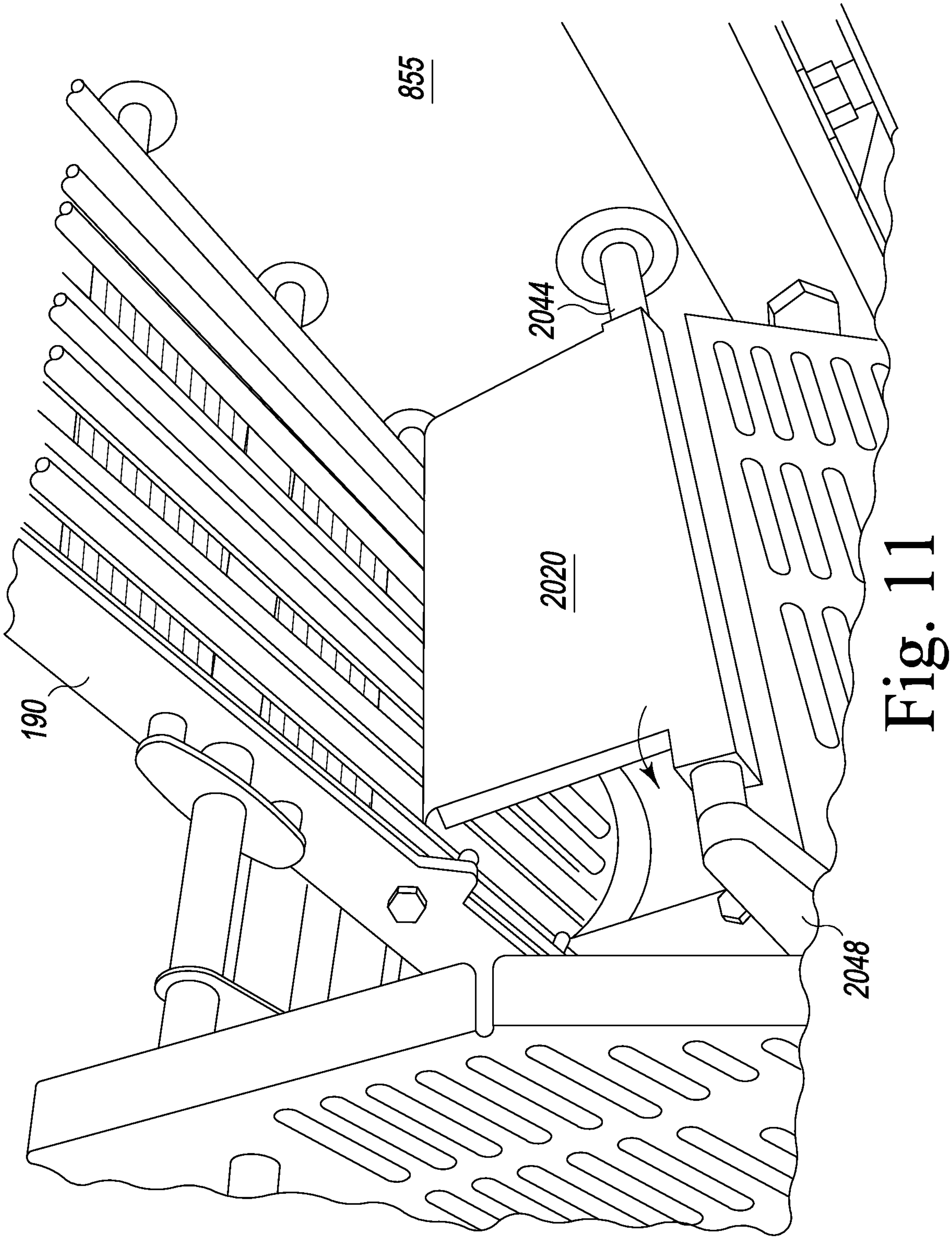
FIG. 11 is an enlarged, fragmentary near side perspective view of a portion of the slicing machine of FIG. 1.
Figure 12:
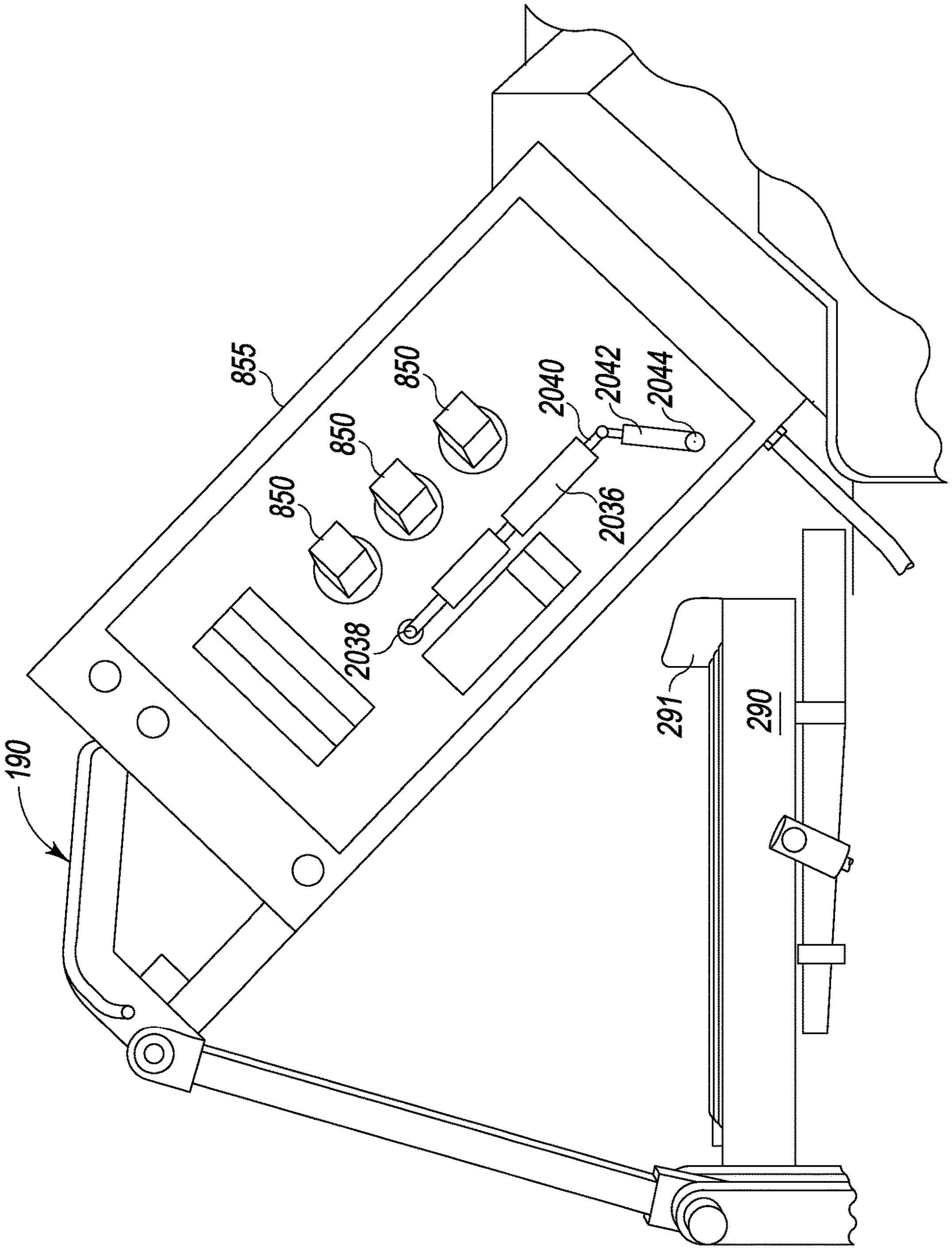
FIG. 12 is an enlarged, fragmentary far side perspective view with a door removed to show underlying components.
Figure 13A:
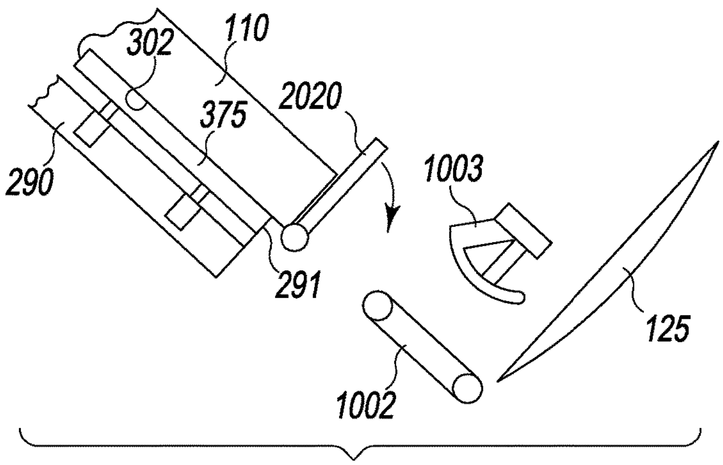
FIG. 13A is a schematic diagram of the loaf feed apparatus in a first stage of operation.
Figure 13B:
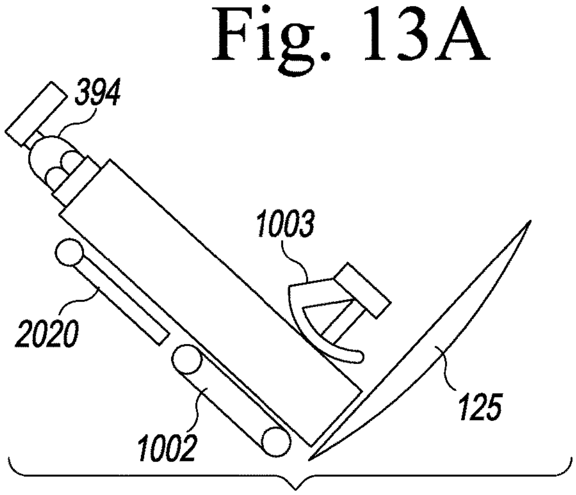
FIG. 13B is a schematic diagram of the loaf feed apparatus in a second stage of operation.
Figure 13C:
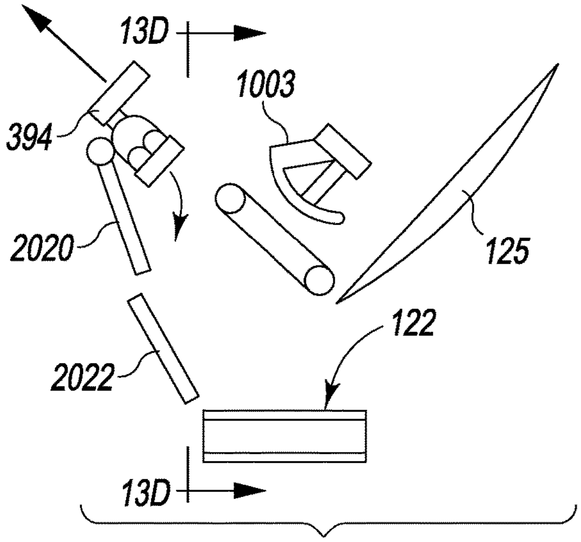
FIG. 13C is a schematic diagram of the loaf feed apparatus in a third stage of operation.
Figure 13D:
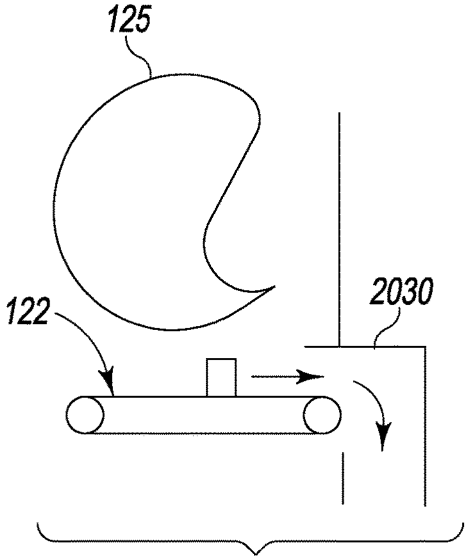
FIG. 13D is a schematic diagram of the loaf feed apparatus taken generally along line 13D-13D of FIG. 13C.

The gate 2020 can be operated to be positioned according to FIGS. 13A-13C by a linear actuator such as a servomotor actuator or a pneumatic cylinder, as shown in FIGS. 11 and 12. A servomotor actuator 2036 is pivotally connected to the upper compartment 855 at a pivot point 2038 and has an actuator rod 2040 pivotally connected to a lever 2042 which is fixedly connected to an axle rod 2044. The axle rod 2044 sealing penetrates through the cabinet wall as shown in FIG. 11. The axle rod 2044 is fixed to the gate 2020. The axle rod 2044 is journaled at an opposite end to a bracket 2048. By extension or retraction of the rod 2044 the gate 2020 can be selectively pivoted. By machine control.

Laser Detectors

A separate food article end detector is used for each of the three illustrated food paths. Preferably, the detectors are laser distance sensors 2002, 2004, 2006. Once the food articles are pivoted by the tray positioning apparatus 228 to the staging position below the feed paths, the sensors 2002, 2004, 2006 sense the ends of each food article in the three lanes on the tray 302, and communicate that information to the machine control. The machine control uses this information to control the servomotors 850 to control the positioning of the grippers to the ends of each food article and also controls the actuation of each gripper. By knowing the exact end of the food article, the grippers know when to be activated to seize the food article.

Slicing Head Section

The slicing head section is as described in WO 2010/011237, herein incorporated by reference.

The slicing block with orifices is also as described in WO 2010/011237, herein incorporated by reference.

The jump conveyor can also be configured as described in U.S. Ser. No. 11/449,574 filed Jun. 8, 2006 or WO 2010/011237, herein incorporated by reference.

Laser Safety Guard System

The laser safety guard system 123 is illustrated in FIGS. 1 and 8. The system comprises a central sensor that projects a horizontal fan beam approximately 360 degrees or as much of an angle as needed. If an obstruction is sensed, such as an operator's arm, one or more machine operations are halted by the machine control. The machine operations, such as the lift tray positioning apparatus, may be halted by machine controls when an obstruction in the fan beam is sensed. Other operations such as the slicing movement of the slicing blade, or the food article feeding apparatus, may also be halted with the laser safety guard system.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A food article slicing machine comprising:
   - a slicing station comprising a knife blade and a knife blade drive driving the blade along a cutting path in a cutting plane; and
   - a food article feed apparatus comprising an upper conveyor assembly comprising a support frame and at least two independently driven feed assemblies on the frame, each feed assembly including:
     - a drive belt coupled to the support frame by a drive shaft and a drive roller on the drive shaft,
     - an endless conveyor belt,
     - a drive pulley coupled to the support frame and having a toothed outer diameter for engaging with the endless conveyor belt and a toothed recessed diameter for engaging with the drive belt,
     - an idler roller having a toothed outer diameter for engaging with the endless conveyor belt,
     - a servomotor for driving the drive shaft, the drive roller and the drive belt, which in turn drives the endless conveyor belt, and
     - a food article gripper connected to the conveyor belt, the food article gripper configured to engage and move a food article along a food article feed path, wherein the food article gripper is activated between a closed position, in which the food article gripper seizes a food article, and an open position, in which the food article gripper releases a food article, wherein movement of the endless conveyor belt is in a plane parallel to the food article feed path;

wherein the drive pulleys are coupled to the support frame by a common shaft;

a tension adjustment mechanism coupled to the idler rollers, wherein the tension adjustment mechanism is configured to be released to allow movement of the idler rollers relative to the support frame and to be locked to prevent movement of the idler rollers relative to the support frame, the tension adjustment mechanism comprising a common idler roller shaft coupled to each of the idler rollers, a first member slidably mounted on a first side of the support frame which supports a first end of the common idler roller shaft, a first cam roller rotatably mounted on the support frame and engaged with the first member, wherein the first cam roller can be unlocked and rotated relative to the support frame to cause longitudinal movement of the first member and the first end of the common idler roller shaft and locked against rotation relative to the support frame to prevent longitudinal movement of the first member and the first end of the common idler roller shaft relative to the support frame, a second member slidably mounted on a second opposite side of the support frame which supports a second end of the common idler roller shaft, and a second cam roller rotatably mounted on the support frame and engaged with the second member, wherein the second cam roller can be unlocked and rotated relative to the support frame to cause longitudinal movement of the second member and the second end of the common idler roller shaft and locked against rotation relative to the support frame to prevent longitudinal movement of the second member and the second end of the common idler roller shaft relative to the support frame; and a food article loading apparatus having an upper surface upon which food articles are configured to be loaded, the upper surface being disposed vertically below bottom runs of the endless conveyor belts at least during engagement of the food article grippers with the food articles.

2. The food article slicing machine of claim 1, wherein each food article feed path comprises a lane within a lift tray.

3. The food article slicing machine of claim 1, wherein a food article gate disposed upstream of the slicing station forms a portion of the food article feed path.

4. The food article slicing machine of claim 3, wherein the food article loading apparatus includes a lift tray assembly moveable between a staging position and an elevated position, said elevated position being a position wherein the food articles disposed within the lift tray assembly are in the food article feed path; and wherein the food articles are supported in position along the food article feed path by at least the food article gate when the lift tray assembly is moved from its elevated position.

5. The food article slicing machine of claim 1, wherein the food article feed path feeds the food article between a front lower conveyor and an upper presser plate upstream of the slicing station.

6. The food article slicing machine of claim 5 wherein the lower conveyor pivots between a first position which decreases the distance between the upper presser plate and the lower conveyor, and a second position which increases the distance between the upper presser plate and the lower conveyor.

7. The food article slicing machine of claim 1, wherein each servomotor is arranged on the same side of the endless conveyor belts.

8. The food article slicing machine of claim 1, wherein each endless conveyor belt can be timed to move food articles towards the slicing station at the same rate.

9. The food article slicing machine of claim 1, comprising three independently driven feed assemblies.

10. The food article slicing machine of claim 1, wherein each cam roller is locked by a fastener coupled to the support frame.

* * * * *